US012783512B2

(12) United States Patent
Schilders

(10) Patent No.: US 12,783,512 B2
(45) Date of Patent: Nov. 3, 2026

(54) SYSTEMS AND METHODS FOR INFORMATION RETRIEVAL FROM GRAPH-BASED MODELS

(71) Applicant: INFOSYS LIMITED, Bangalore (IN)

(72) Inventor: Steven Schilders, Columbus, IN (US)

(73) Assignees: Infosys Limited, Bangalore (IN); InvertIT Inc., Columbus, IN (US)

( * ) Notice: Subject to any disclaimer, the term of this patent is extended or adjusted under 35 U.S.C. 154(b) by 0 days.

(21) Appl. No.: 18/589,084

(22) Filed: Feb. 27, 2024

(65) Prior Publication Data

US 2024/0289328 A1 Aug. 29, 2024

Related U.S. Application Data

(60) Provisional application No. 63/448,831, filed on Feb. 28, 2023, provisional application No. 63/455,642, filed on Mar. 30, 2023.

(51) Int. Cl.
*G06F 16/2452* (2019.01)
*G06F 16/22* (2019.01)
*G06F 16/248* (2019.01)

(52) U.S. Cl.
CPC ........ *G06F 16/24526* (2019.01); *G06F 16/22* (2019.01); *G06F 16/248* (2019.01)

(58) Field of Classification Search
None
See application file for complete search history.

(56) References Cited

U.S. PATENT DOCUMENTS

| | | | | |
|---|---|---|---|---|
| 2021/0365457 | A1* | 11/2021 | Venema | G06F 16/248 |
| 2021/0390420 | A1* | 12/2021 | Barnett | G06N 5/02 |
| 2023/0090050 | A1* | 3/2023 | Kellner | G06F 16/2425 707/715 |
| 2023/0185797 | A1* | 6/2023 | Oattes | G06F 16/287 707/766 |
| 2024/0394072 | A1* | 11/2024 | Ghafourifar | G06F 9/451 |

* cited by examiner

*Primary Examiner* — Dawaune A Conyers
(74) *Attorney, Agent, or Firm* — Finnegan, Henderson, Farabow, Garrett & Dunner, LLP

(57) ABSTRACT

A graph-based model comprises a plurality of entity nodes indicative of a plurality of entities within a dataset and a hierarchical structure of nodes. The hierarchical structure of nodes include a plurality of data nodes indicative of a plurality of data values associated with the plurality of entities and a plurality of context nodes coupled between the plurality of entity nodes and the plurality of data nodes. The plurality of context nodes define contextual relationships between the plurality of entity nodes and the plurality of data nodes. A query comprising a query value is received and a node within the hierarchical structure of nodes is identified based on the query value. A traversal path is determined from the node to a first entity node related to the node and a response to the query is generated based on the traversal path.

20 Claims, 10 Drawing Sheets

PRIOR ART

SYSTEMS AND METHODS FOR INFORMATION RETRIEVAL FROM GRAPH-BASED MODELS

RELATED APPLICATIONS

The present application claims priority to U.S. Patent Application Ser. No. 63/448,831, filed Feb. 28, 2023, entitled "Property in Overlay Graphs," and U.S. Patent Application Ser. No. 63/455,642, filed Mar. 30, 2023, entitled "Directed Property Graphs" which are both incorporated herein by reference in their entirety.

TECHNICAL FIELD

The present disclosure relates to graph-based models and more particularly executable graph-based models. Particularly, but not exclusively, the present disclosure relates to contextual data retrieval from executable graph-based models.

BACKGROUND

Modern system designs typically separate data storage from any functional data structure used from a processing logic perspective. This separation often occurs when data is "at rest" or at run-time where the processing system interacts with a copy of the relevant data in the processing space that can be of a different representation. This separation also leads to an impedance mismatch which requires some form of a data management solution to perform the necessary mappings between the two states. As a result of this separation of concerns, the processing logic is typically performed in a separate technology and physical tier (in an n-tier architecture) from the data. This is illustrated in the example n-tier architecture shown in FIG. 1.

The example n-tier architecture 100 comprises a presentation layer 102, a processing logic layer 104, a data access layer 106, and a database layer 108. The presentation layer 102 comprises applications or components which are used to display the outputs of the processing logic layer 104 to a user or users. The processing logic layer 104 comprises applications, components, or services which perform some form of processing on the data obtained from the data access layer 106. The data access layer 106 comprises the applications, components, and/or services which can access the data used by the processing logic layer 104 and stored at the database layer 108. The database layer 108 handles the persistent storage of the data used by the system (e.g., in the form of a relational database, flat file, NoSQL database, graph database, and the like).

The layers of the example n-tier architecture 100 are technically separated. Each layer may utilize a separate set of components to perform specific functionality (e.g., a database management system is used in the database layer 108 whilst an enterprise application is used in the processing logic layer 104). The layers of the n-tier architecture 100 may also be physically separated. For example, the database layer 108 may execute on a remote cloud service, the processing logic layer 104 may execute on a network within an enterprise, and the presentation layer 102 may execute on a user device within the enterprise. While some architectural designs require a clear separation of concerns between data and the use of the data, often the separation enforced by architectures such as that illustrated in FIG. 1 can severely inhibit the flexibility, extensibility, and responsiveness of any system created.

Therefore, there is a need for enhanced architectures which provide improved flexibility, extensibility, and responsiveness thereby providing more efficient data processing systems.

SUMMARY OF DISCLOSURE

According to an embodiment of the present disclosure, there is provided a system for querying a dataset. The system comprises a memory storing a graph-based model derived from the dataset. The graph-based model comprises a plurality of entity nodes indicative of a plurality of entities within the dataset, and a hierarchical structure of nodes. The hierarchical structure of nodes include a plurality of data nodes indicative of a plurality of data values associated with the plurality of entities, and a plurality of context nodes coupled between the plurality of entity nodes and the plurality of data nodes. The plurality of context nodes define contextual relationships between the plurality of entity nodes and the plurality of data nodes. The system further comprises processing circuitry coupled to the memory and configured to receive a query comprising a query value, identify a node within the hierarchical structure of nodes based on the query value, determine a traversal path from the node to a first entity node related to the node, and generate a response to the query based on the traversal path.

According to a further embodiment of the present disclosure there is provided a method for querying a dataset. The method comprises identifying, by processing circuitry, a graph-based model derived from a dataset, the graph-based model comprising a plurality of entity nodes indicative of a plurality of entities within the dataset, and a hierarchical structure of nodes including a plurality of data nodes indicative of a plurality of data values associated with the plurality of entities, and a plurality of context nodes coupled between the plurality of entity nodes and the plurality of data nodes, wherein the plurality of context nodes define contextual relationships between the plurality of entity nodes and the plurality of data nodes. The method further comprises receiving, by the processing circuitry, a query comprising a query value, identifying, by the processing circuitry, a node within the hierarchical structure of nodes based on the query value, determining, by the processing circuitry, a traversal path from the node to a first entity node related to the node, and generating, by the processing circuitry, a response to the query based on the traversal path.

According to an additional embodiment of the present disclosure there is provided a non-transitory computer readable medium comprising instructions which, when executed by processing logic, cause the processing logic to identify a graph-based model derived from a dataset, the graph-based model comprising a plurality of entity nodes indicative of a plurality of entities within the dataset, and a hierarchical structure of nodes including a plurality of data nodes indicative of a plurality of data values associated with the plurality of entities, and a plurality of context nodes coupled between the plurality of entity nodes and the plurality of data nodes, wherein the plurality of context nodes define contextual relationships between the plurality of entity nodes and the plurality of data nodes, receive a query comprising a query value, identify a node within the hierarchical structure of nodes based on the query value, determine a traversal path from the node to a first entity node related to the node, and generate a response to the query based on the traversal path.

Further embodiments and embodiments of the present disclosure are set out in the appended claims. Advantages will become more apparent to those of ordinary skill in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

BRIEF DESCRIPTION OF FIGURES

Embodiments of the present disclosure will now be described, by way of example only, and with reference to the accompanying drawings, in which.

DETAILED DESCRIPTION

Figure 1:
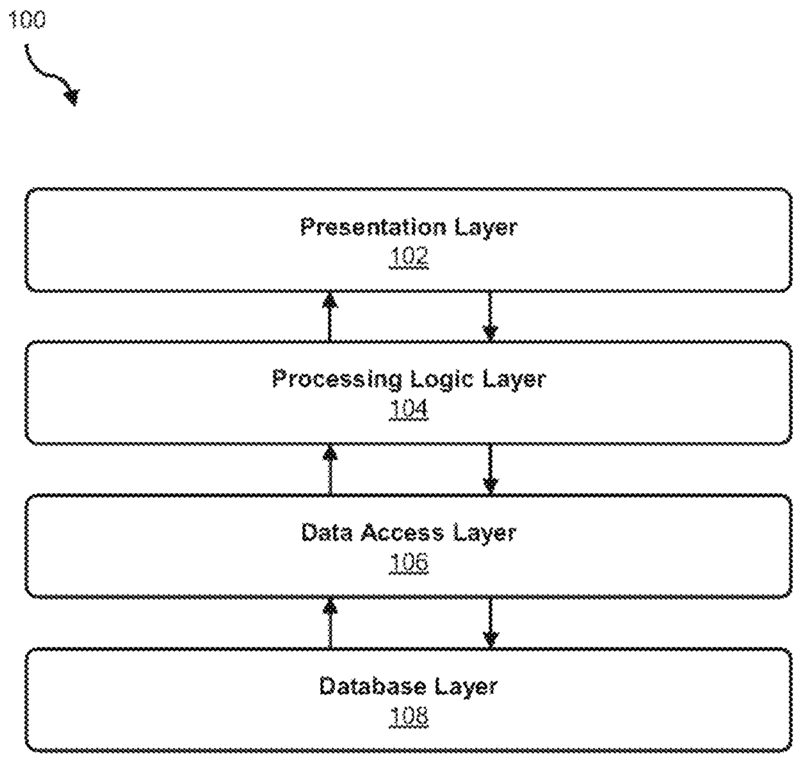
FIG. 1 shows a prior-art n-tier architecture.

Existing architectures, such as that described in relation to FIG. 1 above, maintain a forced technical, and sometimes physical, separation between the processing logic and the data. As previously stated, the technical and physical separation of data and processing logic can be inhibitive to the types of architectural systems that can be created. Furthermore, the complexity of n-tier architectures, and their strict separation of functionality (layers), can severely impact system real-time processing performance. This, in turn, leads to processing delays or latency which reduces the applicability of such architectures being used in time-critical application settings such as medical devices, autonomous vehicles, and real-time control systems. In addition, the central storage of all data within a single database or database layer (e.g., the database layer 108 show in FIG. 1) restricts the ways in which a user may access, maintain, and manage their personal data stored by an enterprise within the single database or database layer.

The present disclosure is directed to executable graph-based models which dynamically combine data and data processing functionality at run-time whilst their separability may be maintained when at rest. This is illustrated in FIG. 2.

Figure 2:
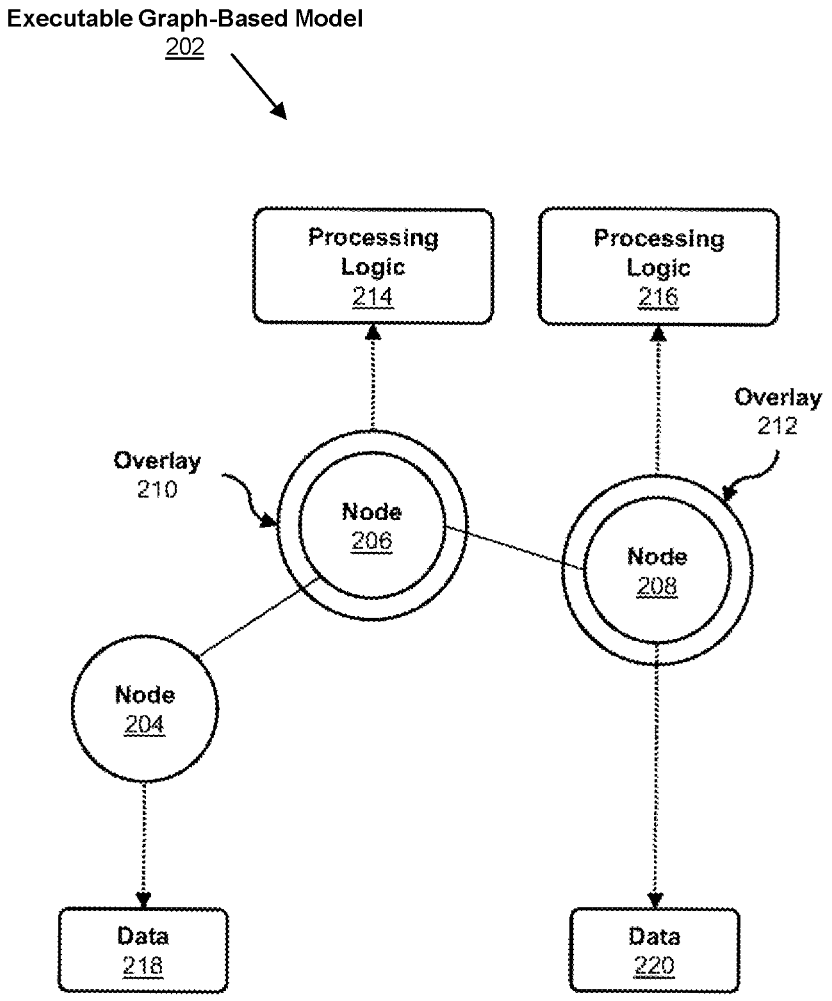
FIG. 2 shows an executable graph-based model according to an embodiment of the present disclosure.

FIG. 2 illustrates an executable graph-based model 202 according to an embodiment of the present disclosure.

The executable graph-based model 202 is generally formed of a data structure (i.e., a graph-based model, or graphical model) comprising a plurality of nodes 204-208. The executable graph-based model 202 enables the plurality of nodes 204-208 to be functionally extended with processing logic via the use of overlays 210, 212. Each overlay comprises processing logic, such as processing logic 214 and 216 which are associated with the overlays 210 and 212 respectively. At run-time, data such as the data 218 and the data 220 are associated with nodes within the executable graph-based model 202 and the overlays 210 and 212 provide the functionality to respond to stimuli an interact with, manipulate, or otherwise process the data. As such, the data processing functionality is separate from the data itself when offline (i.e., when persisted to storage) and is combined dynamically with the data at run-time.

As such, the executable graph-based model 202 maintains separability of the data and the data processing logic when offline thereby allowing the user to maintain control over their data. Moreover, by integrating the data and the data processing logic within a single model, processing delays or latency are reduced because the data and the processing logic exist within the same logical system. Therefore, the executable graph-based model 202 is applicable to a range of time-critical systems where efficient processing of stimuli is required.

In some instances, issues may arise when seeking to execute complex search queries for specific data held within the executable graph-based model 202 at run-time. The search queries may not only be complicated, but the performance of the queries may be significantly impacted by the design of the executable graph-based model 202. Consider the following simple example, "find all objects that contain a certain word or phrase" such as "Washington." Searching for the word "Washington," which in the USA has multiple uses, such as an address (which can be a State name, City name, or Street name) and a person name (which can be the first name, middle name, or last name), and therefore could have significant performance impacts since the executable graph-based model 202 would need to know a way to perform a multi-context based search (in the example an address or person context search), or have an inbuilt capability to allow efficient searching across the overlay structure. Moreover, if the data is not persisted to a storage medium where the data can be transformed into an optimized searchable form, the search may severely suffer a performance penalty proportional to the number of objects in the executable graph-based model 202. If millions or billions of objects are modeled in the overlay structure, then any scanning-based design will have further implications for the search performance in the system to the point where such an approach can be rendered ineffective.

The present disclosure describes an extension to executable graph-based models that provides low-fidelity data implementation mechanisms through the use of context-specific nodes which allow for complex search queries to be efficiently performed on data held within an executable graph-based model.

Figure 3:
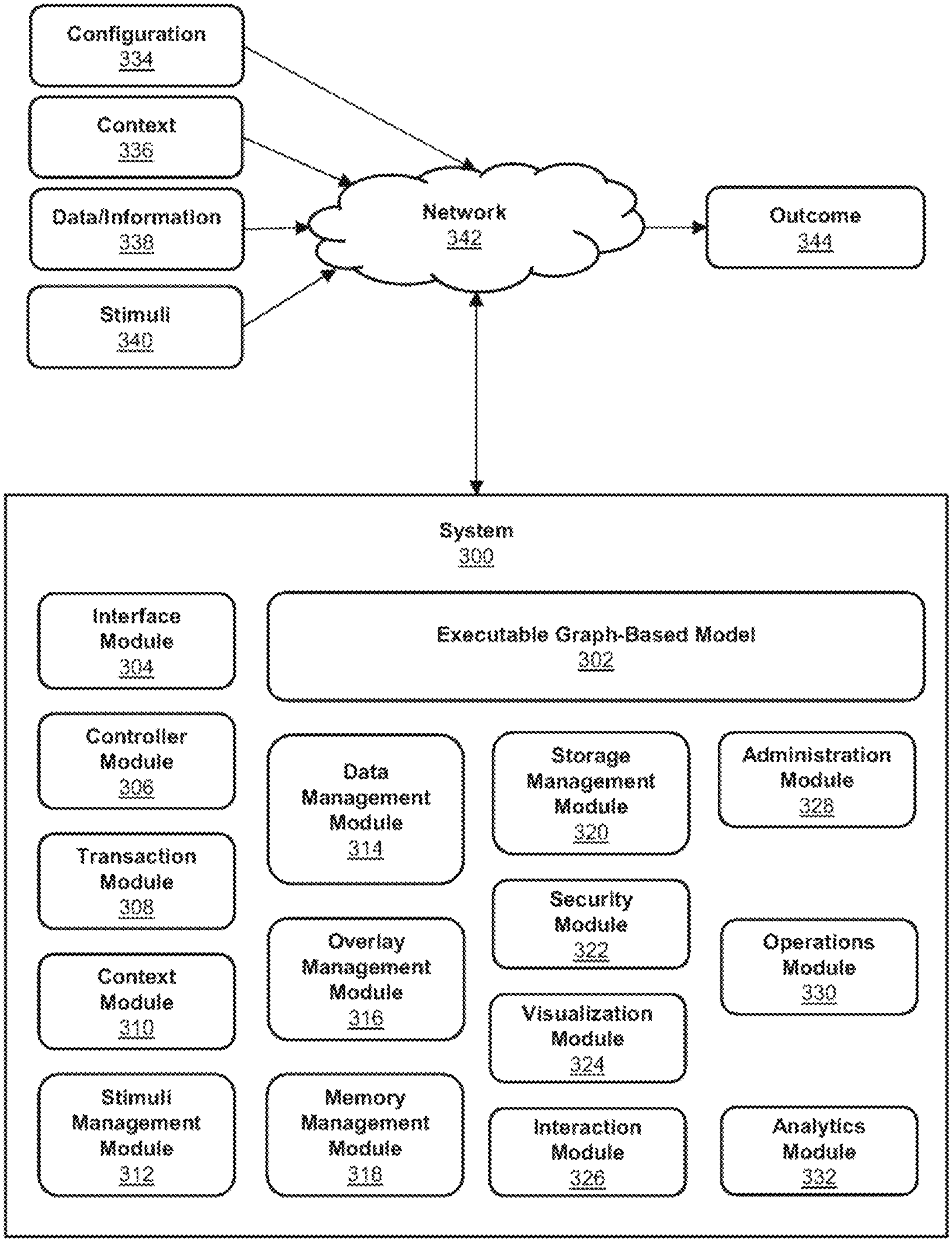
FIG. 3 shows a system for executable graph-based models according to an embodiment of the present disclosure.

FIG. 3 shows a system 300 for execution, management, and configuration of executable graph-based models according to an embodiment of the present disclosure.

The system 300 comprises an executable graph-based model 302 similar to the executable graph-based model 202 described in brief above in relation to FIG. 2. The system 300 further comprises an interface module 304, a controller module 306, a transaction module 308, a context module 310, a stimuli management module 312, a data management module 314, an overlay management module 316, a memory management module 318, a storage management module 320, a security module 322, a visualization module 324, an interaction module 326, an administration module 328, an operations module 330, and an analytics module 332. The interface module 304, the controller module 306, the transaction module 308, the context module 310, the stimuli management module 312, the data management module 314, the overlay management module 316, the memory management module 318, the storage management module 320, the security module 322, the visualization module 324, the interaction module 326, the administration module 328, the operations module 330, and the analytics module 332 may be collectively referred to as "a plurality of modules". FIG. 3 further shows a configuration 334, a context 336, data 338, stimuli 340, a network 342, and an outcome 344.

The skilled person will appreciate that the present description of the system 300 is not intended to be limiting, and the system 300 can include, or interface with, further modules not expressly described herein. Moreover, the functionality of two or more modules of the plurality of modules can be combined within a single module. For example, the functionalities of the memory management module 318, the storage management module 320, and the security module 322 may be combined within a single module. Conversely, the functionality of a single module can be split into two or more further modules which can be executed on two or more devices. The modules described below in relation to the system 300 can operate in a parallel, distributed, or networked fashion. The system 300 can be implemented in software, hardware, or a combination of both software and hardware. Examples of suitable hardware modules include, a general-purpose processor, a field programmable gate array (FPGA), and/or an application specific integrated circuit (ASIC). Software modules can be expressed in a variety of software languages such as C, C++, Java, Ruby, Visual Basic, Python, and/or other object-oriented, procedural, or other programming language.

The executable graph-based model 302 corresponds to the application-specific combination of data and data processing logic which is manipulated, processed, and/or otherwise handled by the other modules within the system 300. As stated above, the structure and functionality of the data processing logic (e.g., processing logic which reads, manipulates, transforms, etc. the data) is separate from the data itself when offline (or at rest) and is combined dynamically at run-time. As such, different executable graph-based models are utilized for different application areas and problem domains. The skilled person will appreciate that whilst only one executable graph-based model 302 is shown in FIG. 3, in some embodiments a system stores and maintains more than one executable graph-based model.

All elements within the executable graph-based model 302 (both the data and the data processing functionality) are nodes. In other words, nodes represent both the data and the data processing functionality within the executable graph-based model 302. As will be described in more detail in relation to FIG. 4A below, a node forms the fundamental building block of all executable graph-based models such as the executable graph-based models 202 and 302. As such, the executable graph-based model 302 comprises one or more nodes which can be dynamically generated, extended, or processed by one or more other modules within the system 300 (e.g., by the data management module 314 and/or the overlay management module 316). Here, a dynamically generated node is a node within an executable graph-based model which is generated at run-time (e.g., using data obtained at run-time and/or in response to a stimulus or action received at run-time).

The interface module 304 provides a common interface between internal components of the system 300 and/or external sources. The interface module 304 provides an application programmable interface ("API"), scripting interface, or any other suitable mechanism for interfacing externally or internally with any module of the system 300. In the example shown in FIG. 3, the configuration 334, the context 336, the data 338, and the stimuli 340 are received by the interface module 304 of the system 300 via the network 342. Similarly, outputs produced by the system 300, such as the outcome 344, are passed by the interface module 304 to the network 342 for consumption or processing by external systems. In one embodiment, the interface module 304 supports one or more messaging patterns or protocols such as the Simple Object Access protocol (SOAP), the REST protocol, and the like. The interface module 304 thus allows the system 300 to be deployed in any number of application areas, operational environments, or architecture deployments. Although not illustrated in FIG. 3, the interface module 304 is communicatively coupled (i.e., connected either directly or indirectly) to one or more other modules or elements within the system 300 such as the controller module 306, the context module 310, the executable graph-based model 302 and the like. In one embodiment, the interface module 304 is communicatively coupled (i.e., connected either directly or indirectly) to one or more overlays within the executable graph-based model 302.

The controller module 306 handles and processes interactions and executions within the system 300. As will be described in more detail below, stimuli (and their associated contexts) provide the basis for all interactions within the executable graph-based model 302. Processing of such stimuli may lead to execution of processing logic associated with one or more overlays within the executable graph-based model 302. The processing of a stimulus within the system 300 may be referred to as a system transaction. The processing and execution of stimuli (and associated overlay execution) within the system 300 is handled by the controller module 306. The controller module 306 manages all received input stimuli (e.g., the stimuli 340) and processes them based on a corresponding context (e.g., the context 336). The context associated with a stimulus determines the priority that is assigned to processing the stimulus by the controller module 306. This allows each stimulus to be configured with a level of importance and prioritization within the system 300.

The controller module 306 maintains the integrity of the modules within the system 300 before, during, and after a system transaction. The transaction module 308, which is associated with the controller module 306, is responsible for maintaining integrity of the system 300 through the lifecycle of a transaction. Maintaining system integrity via the controller module 306 and the transaction module 308 allows a transaction to be rolled back in the event of an expected or unexpected software or hardware fault or failure. The controller module 306 is configured to handle the processing of stimuli and transactions through architectures such as parallel processing, grid computing, priority queue techniques, and the like. In one embodiment, the controller module 306 and the transaction module 308 are communicatively coupled (i.e., connected either directly or indirectly) to one or more overlays within the executable graph-based model 302.

As stated briefly above, the system 300 utilizes a context-driven architecture whereby a stimulus within the system 300 is associated with a context which is used to adapt the handling or processing of the stimulus by the system 300. The context module 310 manages the handling of contexts within the system 300 and is responsible for processing any received contexts (e.g., the context 336) and translating the received context to an operation execution context. In some examples, the operation execution context is larger than the received context because the context module 310 supplements the received context with further information necessary for the processing of the received context. The context module 310 passes the operational execution context to one or more other modules within the system 300 to drive the execution of the stimulus associated with the operational execution context. Contexts within the system 300 can be external or internal. While some contexts apply to all application areas and problem spaces, some applications may require specific contexts to be generated and used to process received stimuli. As will be described in more detail below, the executable graph-based model 302 is configurable (e.g., via the configuration 334) so as only to execute within a given execution context for a given stimulus.

The stimuli management module 312 processes externally received stimuli (e.g., the stimuli 340) and any stimuli generated internally from any module within the system 300. The stimuli management module 312 is communicatively coupled (i.e., connected either directly or indirectly) to one or more overlays within the executable graph-based model 302 to facilitate processing of stimuli within the executable graph-based model 302. The system 300 utilizes different types of stimuli such as a command (e.g., a transactional request), a query, or an event received from an external system such as an Internet-of-Things (IoT) device. As previously stated, a stimulus can be either externally or internally generated. For example, a stimulus can be an event internally triggered (generated) from any of the modules within the system 300. Such internal stimuli indicate that something has happened within the system 300 such that subsequent handling by one or more other modules within the system 300 may be required. Internal stimuli can also be triggered (generated) from execution of processing logic associated with overlays within the executable graph-based model 302. The stimuli management module 312 communicates and receives stimuli in real-time or near-real-time. In some examples, stimuli are scheduled in a batch process. The stimuli management module 312 utilizes any suitable synchronous or asynchronous communication architectures or approaches in communicating the stimuli (along with associated information). All stimuli within the system 300 are received and processed (along with a corresponding context) by the stimuli management module 312, which then determines the processing steps to be performed. In one embodiment, the stimuli management module 312 processes the received stimuli in accordance with a predetermined configuration (e.g., the configuration 334) or dynamically determines what processing needs to be performed based on the contexts associated with the stimuli and/or based on the state of the executable graph-based model 302. In some examples, processing of a stimulus results in one or more outcomes being generated (e.g., the outcome 344). Such outcomes are either handled internally by one or more modules in the system 300 or communicated via the interface module 304 as an external outcome. In one embodiment, all stimuli and corresponding outcomes are recorded for auditing and post-processing purposes (e.g., by the operations module 330 and/or the analytics module 332).

The data management module 314 manages all data or information within the system 300 (e.g., the data 338) for a given application. Operations performed by the data management module 314 include data loading, data unloading, data modelling, and data processing. The data management module 314 is communicatively coupled (i.e., connected either directly or indirectly) to one or more other modules within the system 300 to complete some or all of these operations. For example, data storage is handled in conjunction with the storage management module 320 (as described in more detail below).

The overlay management module 316 manages all overlays within the system 300. Operations performed by the overlay management module 316 includes overlay and overlay structure modelling, overlay logic creation and execution, and overlay loading and unloading (within the executable graph-based model 302). The overlay management module 316 is communicatively coupled (i.e., connected either directly or indirectly) to one or more other modules within the system 300 to complete some or all of these operations. For example, overlays can be persisted in some form of physical storage using the storage management module 320 (as described in more detail below). As a further example, overlays can be compiled and preloaded into memory via the memory management module 318 for faster run-time execution. The design and functionality of overlays is discussed in greater detail in relation to FIG. 4A below.

The memory management module 318 is configured to manage and optimize the memory usage of the system 300. The memory management module 318 thus helps to improve the responsiveness and efficiency of the processing performed by one or more of the modules within the system 300 by optimizing the memory handling performed by these modules. The memory management module 318 uses direct memory or some form of distributed memory management architecture (e.g., a local or remote caching solution). Additionally, or alternatively, the memory management module 318 deploys multiple different types of memory management architectures and solutions. (e.g., reactive caching approaches such as lazy loading or a proactive approach such as write-through cache may be employed). These architectures and solutions are deployed in the form of a flat (single-tiered) cache or a multi-tiered caching architecture where each layer of the caching architecture can be implemented using a different caching technology or architecture solution approach. In such implementations, each cache or caching tier can be configured (e.g., by the configuration 334) independently to the requirements for one or more of modules of the system 300. For example, data priority and an eviction strategy, such as least-frequently-used ("LFU") or least-recently-used ("LRU"), can be configured for all or parts of the executable graph-based model 302. In one embodiment, the memory management module 318 is communicatively coupled (i.e., connected either directly or indirectly) to one or more overlays within the executable graph-based model 302.

The storage management module 320 manages the temporary or permanent storage of data within the system 300. The storage management module 320 is any suitable low-level storage device solution (such as a file system) or any suitable high-level storage technology such as another database technology (e.g., relational database management system (RDBMS) or NoSQL database). The storage management module 320 is directly connected to the storage device upon which the relevant data is persistently stored. For example, the storage management module 320 can directly address the computer readable medium (e.g., hard disk drive, external disk drive, or the like) upon which the data is being read or written. Alternatively, the storage management module 320 is connected to the storage device via a network such as the network 342 shown in FIG. 3. The storage management module 320 uses "manifests" to manage the interactions between the storage device and the modules within the system 300. In one embodiment, the storage management module 320 is communicatively coupled (i.e., connected either directly or indirectly) to one or more overlays within the executable graph-based model 302.

The security module 322 manages the security of the system 300. This includes the security at a system level and at a module level. Security is hardware related, network related, or software related, depending on the operational environment, the architecture of the deployment, or the data and information contained within the system 300. For example, if the system is deployed with a web-accessible API (as described above in relation to the interface module 304), then the security module 322 can enforce a hypertext transfer protocol secure (HTTPS) protocol with the necessary certification. As a further example, if the data or information received or processed by the system 300 contains Personally Identifiable Information (PII) or Protected Health Information (PHI), then the security module 322 can implement one or more layers of data protection to ensure that the PII or PHI are correctly processed and stored. In an additional example, in implementations whereby the system 300 operates on United States of America citizen medical data, the security module 322 can enforce additional protections or policies as defined by the United States Health Insurance Portability and Accountability Act (HIPAA). Similarly, if the system 300 is deployed in the European Union (EU), the security module 322 can enforce additional protections or policies to ensure that the data processed and maintained by the system 300 complies with the General Data Protection Regulation ("GDPR"). In one embodiment, the security module 322 is communicatively coupled (i.e., connected either directly or indirectly) to one or more overlays within the executable graph-based model 302 thereby directly connecting security execution to the data/information in the executable graph-based model 302. The security module 322 thus acts as a centralized coordinator working in conjunction with the data management module 314 and overlay management module 316 for managing and executing security-based overlays.

The visualization module 324 and the interaction module 326 facilitate display and interaction of the executable graph-based model 302 and other parts of the system 300. As described in more detail below in relation to FIGS. 9A-9G, the visualization module 324 provides one or more displays, or visualizations, of the executable graph-based model 302 for review by a user of the system 300, whilst the interaction module 326 processes user interactions (e.g., inputs, commands, etc.) with the displays, or visualizations, and/or any other module within the system 300. The visualization module 324 and the interaction module 326 provide complex interactions capabilities such as standard two- and three-dimensional device interactions using a personal computer or mobile device and their attachable peripherals (e.g., keyboard, mouse, screen, etc.). Additionally, or alternatively, visualization module 324 and the interaction module 326 provide more advanced multi-dimensional user and visualization experiences such as virtual reality ("VR") or augmented reality ("AR") solutions. In one embodiment, the visualization module 324 and the interaction module 326 are communicatively coupled (i.e., connected either directly or indirectly) to one or more overlays within the executable graph-based model 302.

The administration module 328 manages all configurable embodiments of the system 300 and the associated modules therein. Configuration is either directly embedded within the modules of the system 300 (for example, via hardware, bios, or other systems settings that are preset in the manufacturing process or software development and installation processes) or provided as dynamic configurations (e.g., via the configuration 334). Such dynamic configurations are controllable and changeable by an end-user with the appropriate administrative privileges. In one embodiment, the degree of administrative privileges associated with an end-user are contained within a received context (e.g., the context 336). Here, the end-user is a person connected to the administration module 328 via the interface module 304 or a system user directly connected to the administration module 328. In one embodiment, the administration module 328 provides read-only access to all configuration settings or allows some (or all) of the configuration settings to be changed by specific user groups defined in the administration module 328 (e.g., all users associated with a user group having sufficient access privileges). In embodiments where configurations are pre-set or predetermined, the administration module 328 provides capabilities to reset or return the system 300 to its initial state or "factory settings". In one embodiment, the administration module 328 is communicatively coupled (i.e., connected either directly or indirectly) to one or more overlays within the executable graph-based model 302.

The operations module 330 tracks operational metrics, module behavior, and the system 300. Operational metrics tracked by the operations module 330 include the running status of each module, the operating performance of transactions performed, and any other associated metrics to help determine the compliance of the entire system, or any module thereof, in relation to non-functional requirements. In one embodiment, the operations module 330 is communicatively coupled (i.e., connected either directly or indirectly) to one or more overlays within the executable graph-based model 302.

The analytics module 332 performs any analytical processing required by the modules within the system 300. The analytics module 332 processes any data embedded, or overlay contained, within the executable graph-based model 302 or created separately by the system 300 (e.g., the operation metrics produced by the operations module 330). As such, the analytics module 332 is communicatively coupled (i.e., connected either directly or indirectly) to one or more nodes and/or one or more overlays within the executable graph-based model 302.

Having now described the system 300 for executing and managing executable graph-based models, the description will now turn to the elements of an executable graph-based model; specifically, the concept of a node. Unlike conventional graph-based systems, all objects (e.g., data, overlays, etc.) within the executable graph-based model (e.g., the executable graph-based model 302) are implemented as nodes. As will become clear, this allows executable graph-based models to be flexible, extensible, and highly configurable.

Figure 4A:
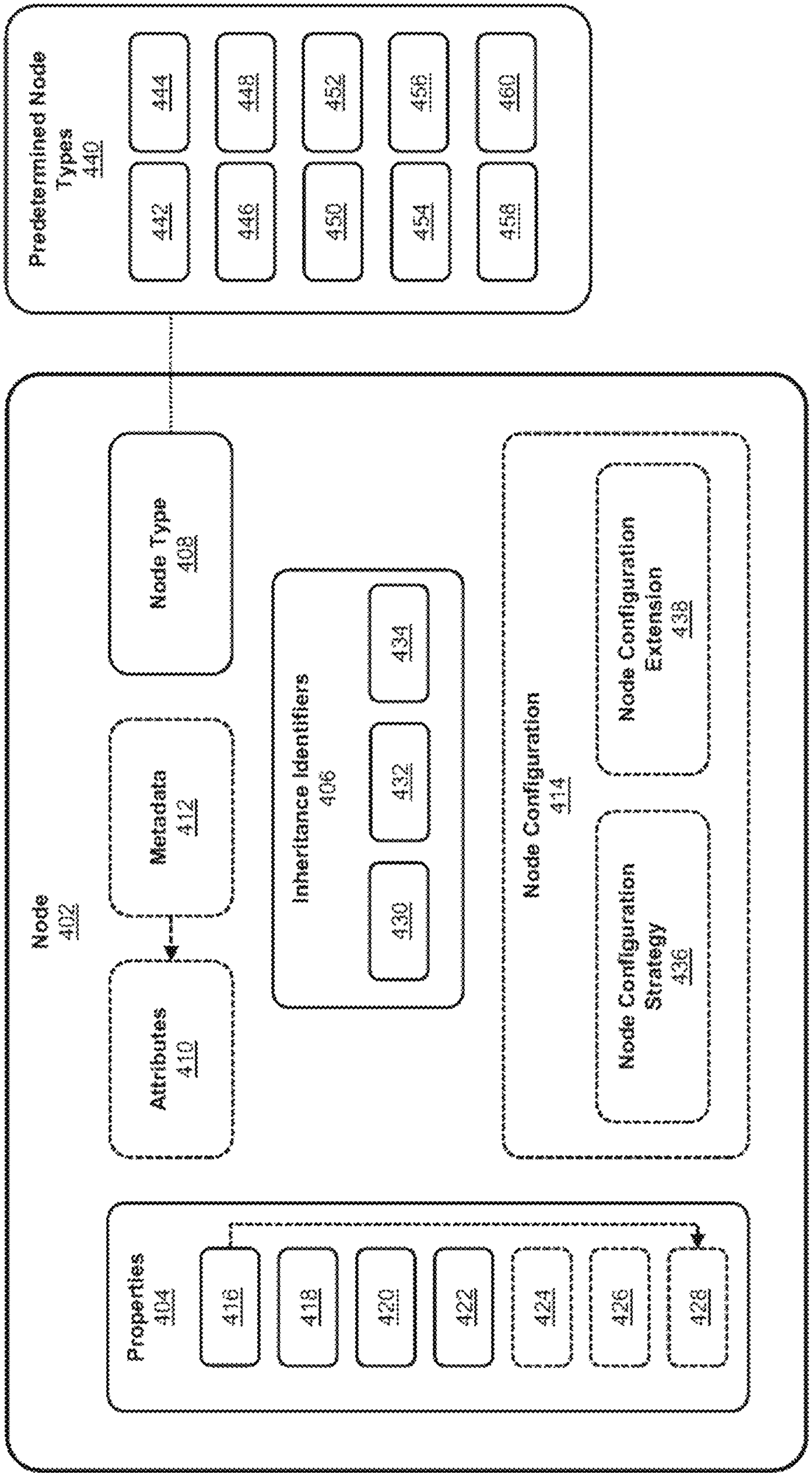
FIG. 4A shows the general structure of a node within an executable graph-based model according to an embodiment of the present disclosure.

FIG. 4A shows the general structure of a node 402 within an executable graph-based model, such as the executable graph-based model 302 shown in FIG. 3, according to an embodiment of the present disclosure.

FIG. 4A shows a node 402 which corresponds to the core structure of an executable graph-based model (e.g., the executable graph-based model 302 shown in the system 300 of FIG. 3) and which forms the foundational building block for all data and data processing logic within the executable graph-based model. The node 402 comprises properties 404, inheritance identifiers 406, and node type 408. The node 402 optionally comprises one or more attributes 410, metadata 412, a node configuration 414. The properties 404 of the node 402 include a unique identifier 416, a version identifier 418, a namespace 420, and a name 422. The properties 404 optionally include one or more icons 424, one or more labels 426, and one or more alternative identifiers 428. The inheritance identifiers 406 of the node 402 comprise an abstract flag 430, a leaf flag 432, and a root flag 434. The node configuration 414 optionally comprises one or more node configuration strategies 436 and one or more node configuration extensions 438. FIG. 4A further shows a plurality of predetermined node types 440 which include a data node type 442, a value node type 444, an edge node type 446, a role node type 448, and an overlay node type 450. The plurality of predetermined node types 440 further include node types which support the inclusion of contexts, or properties, within graph-based models: a data context node type 452, a reference context node type 454, a shared context node type 456, a shared data context node type 458, and a shared reference context node type 460. These context-specific node types are described in more detail in relation to FIG. 6 below.

The unique identifier 416 is unique for each node within an executable graph-based model. The unique identifier 416 is used to register, manage, and reference the node 402 within the system (e.g., the system 300 of FIG. 3). In some embodiments, the one or more alternative identifiers 428 are associated with the unique identifier 416 to help manage communications and connections with external systems (e.g., during configuration, sending stimuli, or receiving outcomes). The version identifier 418 of the node 402 is incremented when the node 402 undergoes transactional change. This allows the historical changes between versions of the node 402 to be tracked by modules or overlays within the system. The namespace 420 of the node 402, along with the name 422 of the node 402, is used to help organize nodes within the executable graph-based model. That is, the node 402 is assigned a unique name 422 within the namespace 420 such that the name 422 of the node 402 need not be unique within the entire executable graph-based model, only within the context of the namespace 420 to which the node 402 is assigned.

The node 402 optionally comprises one or more icons 424 which are used to provide a visual representation of the node 402 when visualized (e.g., by the visualization module 324 of the system 300 shown in FIG. 3). The one or more icons 424 can include icons at different resolutions and display contexts such that the visualization of the node is adapted to different display settings and contexts. The node 402 also optionally comprises one or more labels 426 which are used to override the name 422 when the node is rendered or visualized.

The node 402 supports the software development feature of multiple inheritance by maintaining references (not shown) to zero or more other nodes, which then act as the base of the node 402. This allows the behavior and functionality of a node to be extended or derived from one or more other nodes within an executable graph-based model. The inheritance identifiers 406 of the node 402 provide an indication of the inheritance-based information, which is applicable, or can be applicable, to the node 402. The inheritance identifiers 406 comprise a set of Boolean flags which identify the inheritance structure of the node 402. The abstract flag 430 of the inheritance identifiers 406 allows the node 402 to support the construct of abstraction. When the abstract flag 430 takes a value of "true", the node 402 is flagged as abstract meaning that it cannot be instantiated or created within an executable graph-based model. Thus, a node having the abstract flag 430 set to "true" can only form the foundation of another node that inherits from it. By default, the abstract flag 430 of a node is set to "false". The leaf flag 432 of the inheritance identifiers 406 is used to indicate whether any other node can inherit from the node 402. If the leaf flag 432 is set to "true", then no other node can inherit from the node 402 (but unlike an abstract node, a node with a leaf flag set can still be instantiated and created within an executable graph-based model). The root flag 434 of the inheritance identifiers 406 is used to indicate whether the node 402 inherits from any other node. If the root flag 434 is set to "true", then the node 402 does not inherit from any other node. The node 402 is flagged as leaf (i.e., the leaf flag 432 is set to "true") and/or root (i.e., the root flag 434 is set to "true"), or neither (i.e., both the leaf flag 432 and the root flag 434 are set to "false"). The skilled person will appreciate that a node cannot be flagged as both abstract and leaf (i.e., the abstract flag 430 cannot be set to "true" whilst the leaf flag 432 is set to "true").

As stated above, all elements of the executable graph-based model are defined as nodes. This functionality is in part realized due to the use of a node type. The node type 408 of the node 402 is used to extend the functionality of the node 402. All nodes within an executable graph-based model comprise a node type which defines additional data structures and implements additional executable functionality. A node type thus comprises data structures and functionality that is common across all nodes which share that node type. The composition of a node with a node type therefore improves extensibility by allowing the generation of specialized node functionalities for specific application areas. Such extensibility is not present in prior art graph-based models. As illustrated in FIG. 4A, the node 402 and the node type 408 are one logical unit which are not separated in the context of an executing system at run-time (i.e., in the context of execution of an executable graph-based model).

FIG. 4A shows the plurality of predetermined node types 440 which provides a non-exhaustive list of node types which can be associated with a node, such as the node 402.

The data node type 442 (also referred to as a vertex or vertex node type) comprises common data structure and functionality related to the "things" modelled in the graph—i.e., the data.

The value node type 444 comprises common data structures and functionality related to a shared attribute stored at the associated node. Whilst shared attributes are discussed in more detail below, a node having the value node type 444 comprises an attribute value (i.e., the attribute state) which is shared between nodes within the executable graph-based model.

Figure 5:
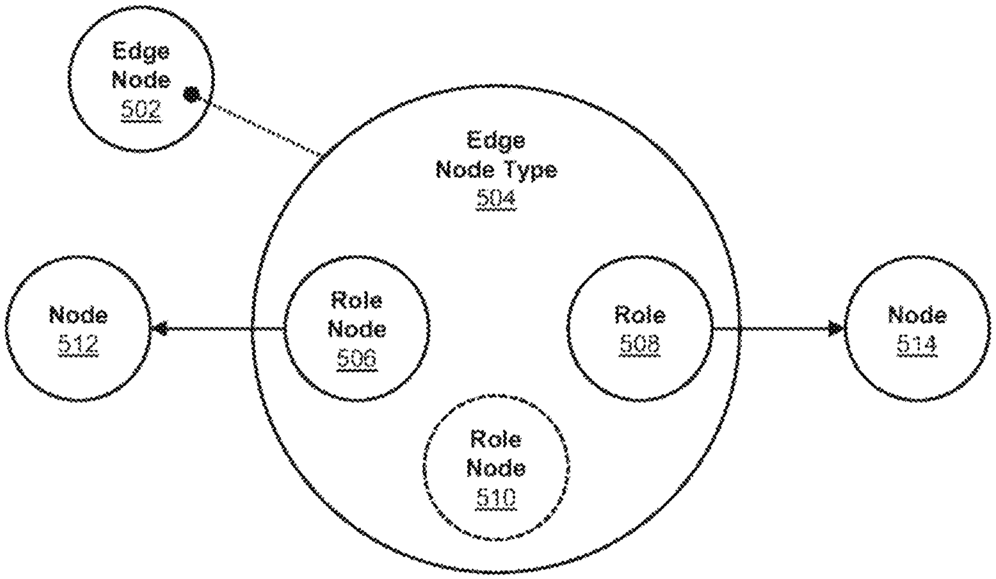
FIG. 5 illustrates the concept of a hyper-edge according to an embodiment of the present disclosure.

The edge node type 446 comprises common data structures and functionality related to joining two or more nodes. A node having the edge node type 446 can connect two or more nodes and thus the edge node type 446 constructs associations and connections between nodes (for example objects or "things") within the executable graph-based model. The edge node type 446 is not restricted to the number of nodes that can be associated or connected by a node having the edge node type 446. The data structures and functionality of the edge node type 446 thus define a hyper-edge which allows two or more nodes to be connected through a defined set of roles. As will be described in more detail below, a role which defines a connective relationship involving an edge is either a (standard) role, as is known within standard hyper-graph theory such that the role merely defines a connection between the edge and another node, or the role is a node having the role node type 448. These concepts are illustrated in FIG. 5 described below.

Referring once again to FIG. 4A, the plurality of predetermined node types 440 further comprise the overlay node type 450. As will be described in more detail below, the overlay node type 450 is used to extend the functionality of a node, such as the node 402, to incorporate processing logic.

The one or more attributes 410 correspond to the data associated with the node 402 (e.g., the data represented by the node 402 within the executable graph-based model as handled by a data management module such as the data management module 314 of the system 300 shown in FIG. 3). Because not all nodes within an executable graph-based model is associated with data, a node need not have any attributes. Each of the one or more attributes 410 are stored in any suitable format such as a data triplet of name, value type, and value. The node 402 optionally comprises metadata 412 (e.g., data stored as a name, value type, and value triplet) which is associated with either the node 402 or one or more of the one or more attributes 410 of the node 402.

An attribute within the one or more attributes 410 may either have independent or shared state. An independent attribute has data which is not shared with any other node within the executable graph-based model. Conversely, a shared attribute has data which is shared with one or more other nodes within the executable graph-based model. For example, if two nodes within an executable graph-based model both comprise a shared-data attribute with a value state shared by both nodes, then updating the data (e.g., the value) of this shared attribute will be reflected across both nodes.

The node configuration 414 provides a high degree of configurability for the different elements of a node. The node configuration 414 optionally comprises one or more node configuration strategies 436 and/or one or more node configuration extensions 438 which are complex data types (as described above in more detail below in relation to FIG. 6). An example of a concrete node configuration strategy is an identifier strategy, associated with the configuration of the unique identifier 416 of the node 402, which creates Snowflake identifiers. A further example of a concrete node configuration strategy is a versioning strategy, associated with the configuration of the version identifier 418 of the node 402, which supports major and minor versioning (depending on the type of transactional change incurred by the node 402).

According to an embodiment of the present disclosure, the structure and functionality of the node 402 (as described above) can be dynamically extended using the concept of an executable node. As described in relation to FIG. 4B below, an executable node provides processing functionality (i.e., processing logic) for a base node via one or more associated overlay nodes.

Figure 4B:
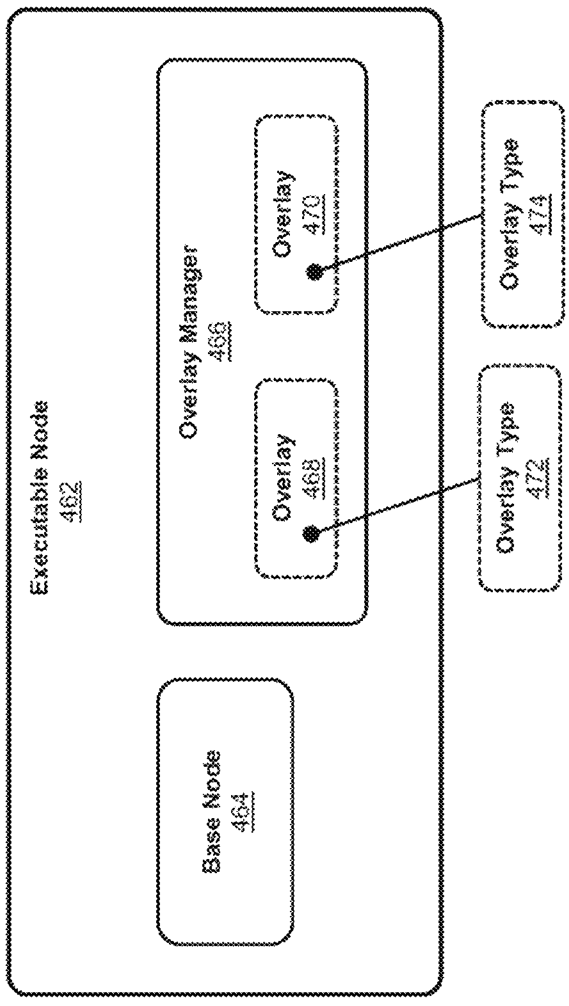
FIG. 4B shows an executable node according to an embodiment of the present disclosure.

FIG. 4B shows an executable node 462 according to an embodiment of the present disclosure.

The executable node 462 comprises a base node 464 and an overlay manager 466. The overlay manager 466 registers and maintains one or more overlay nodes associated with the base node 464, such as the first overlay node 468 and the second overlay node 470. The first overlay node 468 has a first overlay node type 472 and the second overlay node 470 has a second overlay node type 474.

The executable node 462 is itself a node; that is, the executable node 462 extends the node 402 (or is a subtype of the node 402) such that all the functionality and properties of the node 402 extend to the executable node 462. The executable node 462 also dynamically extends the functionality of the base node 464 by associating the overlays maintained by the overlay manager 466 with the base node 464. The executable node may thus be considered a composition of a base node and an overlay node and may alternatively be referred to as a node with overlay. For example, the base node 464 may have a data node type associated with a user, and the overlay manager 466 may comprise an encryption overlay which has processing logic that encrypts the attribute values of the base node 464 prior to the values being saved or output from the system. Therefore, the executable node 462 acts as a decorator of the base node 464 adding the functionality of the overlay manager 466 to the base node 464.

The skilled person will appreciate that the base node 464 refers to any suitable node within an executable graph-based model. As such, the base node 464 can be a node having a type such as a data node type, a value node type, or the like. Alternatively, the base node 464 can itself be an executable node such that the functionality of the base (executable) node 464 is dynamically extended. In this way, complex and powerful processing functionality can be dynamically generated by associating and extending overlay nodes.

The overlay manager 466 registers and maintains one or more overlay nodes associated with the base node 464, such as the first overlay node 468 and the second overlay node 470. The assignment of an overlay node to a base node (via the overlay manager 466) endows the base node with processing logic and executable functionality defined within the overlay node. Extending the functionality of a base node through one or more overlay nodes is at the heart of the dynamic generation of executable graph-based models according to an embodiment of the present disclosure. As illustrated in FIG. 2 above, the data (e.g., a data node as represented by the base node 464 in FIG. 4B) and the functionality which acts upon that data (e.g., an overlay node) can be separated and independently maintained offline, but at run-time, an association between the data node and the overlay node is determined and an executable node is generated (e.g., the executable node 462 shown in FIG. 4B).

An overlay node, such as the first overlay node 468 or the second overlay node 470, is a node having an overlay node type (alternatively referred to as an overlay type) assigned to its node type. As shown in FIG. 4B, the first overlay node 468 has the first overlay node type 472 and the second overlay node 470 has the second overlay node type 474. Different overlay node types are used to realize different functionality. Example overlay node types include an encryption overlay node type, an obfuscation overlay node type, an audit overlay node type, a prediction overlay node type, and the like. For example, if the first overlay node type 472 is an obfuscation node type and the second overlay node type 474 is an encryption node type then the functionality of the base node 464 is extended to provide obfuscation and encryption of attribute values of the base node 464. The skilled person will appreciate that the list of overlay types is in no way exhaustive and the number of different overlay types that can be realized is not limited. Because an overlay node is itself a node, all functionality of a node described in relation to the node 402 of FIG. 4A is thus applicable to an overlay node. For example, an overlay node comprises a unique identifier, a name, etc., can have attributes (i.e., an overlay node can have its own data defined), supports multiple inheritance, and can be configured via node configurations. Furthermore, because an overlay node is a node, the overlay node can have one or more overlay nodes associated therewith (i.e., the overlay node is an overlay with overlay node). Moreover, the processing functionality of an overlay node extends to the node type of the node to which the overlay node is applied.

An overlay node, such as the first overlay node 468 or the second overlay node 470, is not bound to a single executable node or a single executable graph-based model (unlike nodes which have non-overlay node types). This allows overlay nodes to be centrally managed and reused across multiple instances of executable graph-based models.

Unlike non-overlay nodes, an overlay node comprises processing logic (not shown in FIG. 4B) which determines the functionality of the overlay node. The processing logic of an overlay node comprises a block of executable code, or instructions, which carries out one or more operations. The block of executable code is pre-compiled code, code which requires interpretation at run-time, or a combination of both. Different overlay nodes provide different processing logic to realize different functionality. For example, an encryption overlay node comprises processing logic to encrypt the data (i.e., attributes) of a data node associated with the encryption overlay node, whilst an auditing overlay node comprises processing logic to record changes to the nodes state of a node associated with the auditing overlay node.

The overlay manager 466 of the executable node 462 is responsible for executing all overlays registered with the overlay manager 466. The overlay manager 466 also coordinates execution all associated overlay nodes. In the example shown in FIG. 4B, the executable node 462 associates the base node 464 with two overlay nodes—the first overlay node 468 and the second overlay node 470. Thus, the overlay manager 466 employs a strategy to manage the potentially cascading execution flow. Example strategies to manage the cascading execution of overlays include the visitor pattern and the pipe and filter pattern. Further examples include strategies which apply either depth-first or depth-first processing patterns, a prioritization strategy, or a combination therefor. All execution strategies are defined and registered with the overlay manager 466 and are associated with an overlay via a node configuration extension for the overlay.

FIG. 5 illustrates the concept of a hyper-edge connecting two or more nodes through a defined set of roles according to an embodiment of the present disclosure.

FIG. 5 shows a simplified representation of an edge node 502 which comprises an edge node type 504 (within the context of the example shown in FIG. 4A, the edge node 502 corresponds to the node 402 where the node type 408 is the edge node type 446). The edge node type 504 comprises a plurality of roles which each define a connective relationship involving the edge node 502, e.g., a connective relationship between the edge node 502 and another node. The plurality of roles of the edge node type 504 comprises a first role node 506 and a role 508. The plurality of roles optionally comprises a further role in the form of a second role node 510. The first role node 506 is a node having a role node type (i.e., the role node type 448 shown in FIG. 4A) and defines a connective relationship between the edge node 502 and a first node 512. The role 508 defines a connective relationship between the edge node 502 and a second node 514. The second role node 510 is a node having the role node type and defines a relationship without expressly defining the node to which the edge connects. Whilst the example in FIG. 5 shows the edge node type 504 having two, or even three, roles, the number of roles (and thus the number of connections) that an edge node type can have is not so limited.

As stated above, a role defines a connective relationship involving the edge node 502 (via the edge node type 504) and can be either a (standard) role, such as the role 508, or a role node, such as the first role node 506 or the second role node 510. The standard role simply defines a connective relationship between an edge node and another node. Thus, in the example shown in FIG. 5, the role 508 defines the connection between the edge node 502 and the second node 514 (via the edge node type 504). A role node is a node having a role node type (i.e., the role node type 448 shown in FIG. 4A) and, like the (standard) role, defines a connective relationship involving an edge. However, because a role node is a node, a role node gains the capabilities, functionality, and extensibility of a node (as described in relation to FIG. 4A). A role node thus describes a potentially more complex connective relationship than a (standard) role. In the example shown in FIG. 5, the first role node 506 defines a connective relationship between the edge node 502 and the first node 512 (via the edge node type 504). Beneficially, by utilizing the first role node 506 to define the connective relationship between the edge node 502 and the first node 512 the capabilities afforded to a node are provided to the first role node 506. For example, one or more overlay nodes can be associated with a role node to imbue the role node with processing logic thus allowing the role node to process data, respond to stimuli, etc. Moreover, a role node need not define a connective relationship to a node, as illustrated by the second role node 510. Because the second role node 510 is itself a node, the second role node 510 encompasses the data structures and functionality of a node thereby avoiding the need to define the connecting node directly.

Referring once again to executable graph-based models in general, these models allow real-time processing logic to be executed in-situ with a data structure representing a given problem space. As described above, processing logic is encapsulated within an overlay (or overlay node) which is composed with a base node (e.g., a data node, or entity node) to form an executable node. In this way, the latency between data access and execution of corresponding processing logic can be minimized because both the data and processing logic are represented as a single unit within the executable graph-based model.

Execution of processing logic will often utilize the attributes of a node—i.e., the part of a node which stores raw data values at run-time. However, as an attribute forms a component part of the node (as illustrated in FIG. 4A), it can be difficult to assign processing logic efficiently to a specific attribute of a node. Moreover, searching an executable graph-based model for all nodes which contain a value used within a specific context may require an inefficient brute force search of all possible nodes and return nodes which use the value across a range of different contexts, some of which may not be relevant to the original query. This problem is compounded when the executable graph-based model contains hundreds of thousands, if not millions, of nodes held within a volatile memory at run-time.

According to an embodiment of the present disclosure, the above problems can be addressed by representing node attributes, and their contexts, as first-class objects within an executable graph-based model. More particularly, attributes can be represented along with corresponding contexts using context-specific node types that are then associated with the node(s) to which the attribute relates. Differentiating between the different usage contexts of an attribute helps to improve the efficiency and speed of the querying process. Moreover, context-specific node types allow processing logic to be assigned to individual attributes and contextual relationships thereby improving the flexibility and robustness of executable graph-based models.

Figure 6:
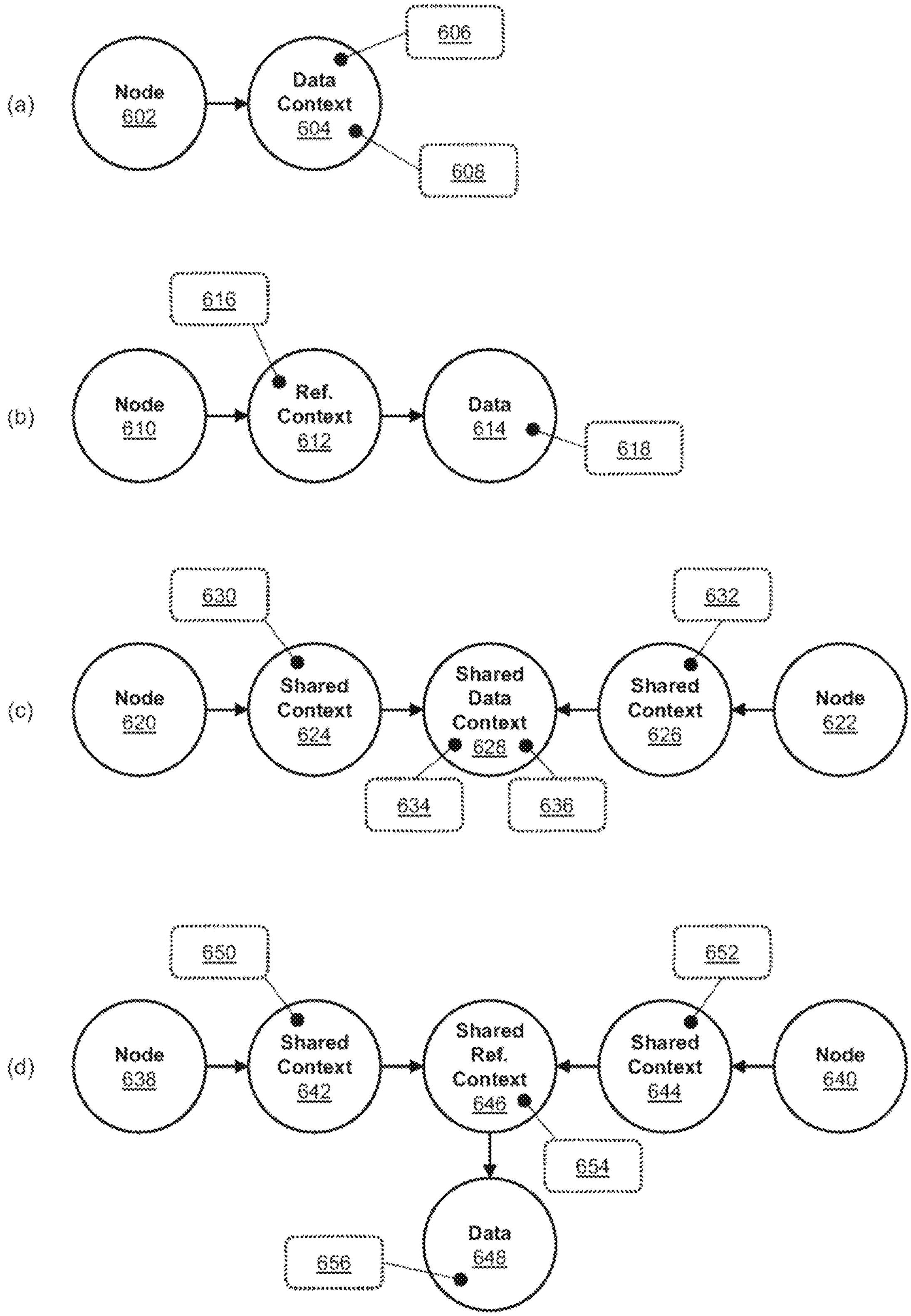
FIG. 6 illustrates context-specific node types according to an embodiment of the present disclosure.

FIG. 6 illustrates context-specific node types according to an embodiment of the present disclosure.

FIG. 6(*a*) shows a first node 602 which has a data context node type 604. The first node 602 may be referred to as a node with context because it has a context-specific node type. The data context node type 604 stores a data value 606 and a context 608 (alternatively referred to as a context value or a property). Throughout the following, it is important to recall that node types—such as the data context node type 604—are nodes within an executable graph-based model (as described above in relation to FIGS. 4A and 4B).

The scenario shown in FIG. 6(*a*) illustrates that, at a fundamental level, context-specific node types allow an attribute of a node to be converted to a first-class object (i.e., a node) within a graph-based model. The data context node type 604 thus represents a single attribute or property of the first node 602 which is now modelled independently by a node in an executable graph-based model rather than being represented as a sub-component of the first node 602 (e.g., as one of the one or more attributes 410 shown in FIG. 4A). Advantageously, the promotion of attributes or properties to first-class objects within a graph-based model allows processing logic to be directly associated with individual attributes through the use of overlays thereby greatly improving the efficiency, extensibility, and flexibility of execution. For example, an overlay can be associated with the data context node type 604 (since, as described above, it is in itself a node) thereby linking the processing logic of the overlay with the data value 606 and/or context 608 stored by the data context node type 604. Without the use of the data context node type 604, the overlay would be associated with the first node 602 and extra processing logic used to determine if any stimuli or events which trigger the processing logic relate to the attribute and the attribute-specific processing logic.

Moreover, the context 608 of the data context node type 604 provides an informational context to the data value 606. That is, the context 608 gives contextual meaning to the data value 606 thereby converting the data value 606 into information. As will become clear in the following, the decoupling of data and context allows for complex information retrieval queries to be executed quickly and efficiently.

FIG. 6(*b*) shows a second node 610 which has a reference context node type 612. The second node 610 may be referred to as a node with context because it has a context-specific node type. The reference context node type 612 references a first data node 614. The reference context node type 612 stores a context 616. The first data node 614 stores a data value 618. The first data node 614 is a node having a data node type (i.e., the data node type 442 shown in FIG. 4A). The reference context node type 612 is referred to as a "reference" context node type because it stores the context 616 but references the data value stored in the data node 614 rather than maintaining the data value itself (cf. the data context node type 604 which directly stores the data value 606 and the context 608).

Unlike the scenario in FIG. 6(*a*), the data and context in FIG. 6(*b*) are decoupled into separate objects—the reference context node type 612 which stores the context 616 and the first data node 614 which stores the data value 618. This allows separate overlay nodes, and thus separate processing logic, to be associated with the context (i.e., with the reference context node type 612) and with the data (i.e., with the data node 614). Moreover, it facilitates fast and efficient querying by promoting the data value to a separate object which may then be referenced via a look up table or index structure.

The examples shown in FIGS. 6(*a*) and (*b*) relate to providing data and context to a single node. That is, the node to which the context-specific node types relate "owns" the associated context-specific node type and does not share it with any other node. For example, the data context node type 604 is owned by the first node 602 and is not used, or referenced, by any other nodes. In contrast, the examples in FIGS. 6(*c*) and (*d*) illustrate how the data and context separation concepts described in FIGS. 6(*a*) and (*b*) can be shared by multiple nodes.

FIG. 6(*c*) shows a third node 620 and fourth node 622. The third node 620 has a first shared context node type 624 and the fourth node has a second shared context node type 626. Both the third node 620 and the fourth node 622 may be referred to as nodes with context because they have context-specific node types. The first shared context node type 624 and the second shared context node type 626 both share a shared data context node type 628. The first context node type 624 has a first context 630 and the second context node type 626 has a second context 632. The shared data context node type 628 stores a shared context 634 and a data value 636. The first shared context node type 624 and the second shared context node type 626 may be considered intermediate context nodes or intermediate context node types.

In FIG. 6(*c*), both the third node 620 and the fourth node 622 have a shared data value—the data value 636 of the shared data context node type 628. That is, neither the third node 620 nor the fourth node 622 "own" the data value 636 of the shared data context node type 628. However, unlike the examples in FIGS. 6(*a*) and (*b*) where a single context is applied to a data value, the third node 620 and the fourth node 622 apply different contexts to the data value 636 by virtue of the first shared context node type 624 and the second shared context node type 626. The first shared context node type 624 applies the first context 630 to the data value 636 when used in relation to the third node 620 whilst the second shared context node type 626 applies the second context 632 to the data value 636 when used in relation to the fourth node 622. In addition, the shared context 634 provides a further context which is applied to the data value 636 for both the third node 620 and the fourth node 622. As such, the first context 630 and the second context 632 provide an overriding, or more refined, context to the shared context 634 whilst either context can be used in the interactions with the third node 620 and the fourth node 622.

As such, the shared data context node type 628, the first shared context node type 624, and the second shared context node type 626 form a hierarchical structure of nodes which represents a contextual hierarchy in relation to the data value 636. The shared data context node type 628 is at the first, or highest, level (i.e., root) of the hierarchical structure whilst the first shared context node type 624 and the second shared context node type 626 are at the second level of the hierarchy. Here, the highest level of the hierarchical structure corresponds to the least refined context, whilst the lowest level of the hierarchical structure corresponds to the most refined context. The hierarchical structure encodes the different contextual relationships between entity nodes (e.g., the third node 620 and the fourth node 622) and the data value 636. These contextual relationships may be uncovered at run-time by traversing from the shared data context node type 624 to each of the entity nodes. For example, the contextual relationship between the data value 636 and the third node 620 can be determined by the traversal path including the shared data context node type 628, the first shared context node type 624, and the third node 620. According to this traversal, the contextual relationship between the data value 636 and the third node 620 encompasses the shared context 634 and the first context 630.

Organizing information within a hierarchical structure of context-specific nodes helps to facilitate efficient context-specific searching and information retrieval. Once a specific node (e.g., a shared data context node or the like) has been found to store a value related to a query, the different contextual paths originating from this node can then be used to provide a context-specific response to the query. For example, a context associated with a query may be used to determine that the second context 632 of the second shared context node type 626 is more relevant to the query than the first context 630 of the first shared context node type 624 thereby identifying the fourth node 622 as being an entity relevant to the response of the query.

FIG. 6(*d*) shows a fifth node 638 and a sixth node 640. The fifth node 638 has a third shared context node type 642 and the sixth node 640 has a fourth shared context node type 644. Both the fifth node 638 and the sixth node 640 may be referred to a nodes with context because they have context-specific node types. The third shared context node type 642 and the fourth shared context node type 644 both share a shared reference context node type 646 which references a second data node 648. The third shared context 642 has a third context 650, the fourth shared context 644 has a fourth context 652, and the shared reference context 646 has a fifth context 654. The second data node 648 stores a data value 656.

As in the example shown in FIG. 6(*b*), in FIG. 6(*d*) the data value and the context are decoupled into the second data node 648 and the shared reference context node type 646 (the second data node 648 can be associated to one or more additional contexts which are not shown in FIG. 6). In this way, the second data node 648 can be indexed at run-time thereby facilitating fast and efficient contextual search (as illustrated by the example shown in FIG. 7 below). Furthermore, the second data node 648 (and similarly the first data node 614) can be used in querying when no context is known or provided.

Figure 7:
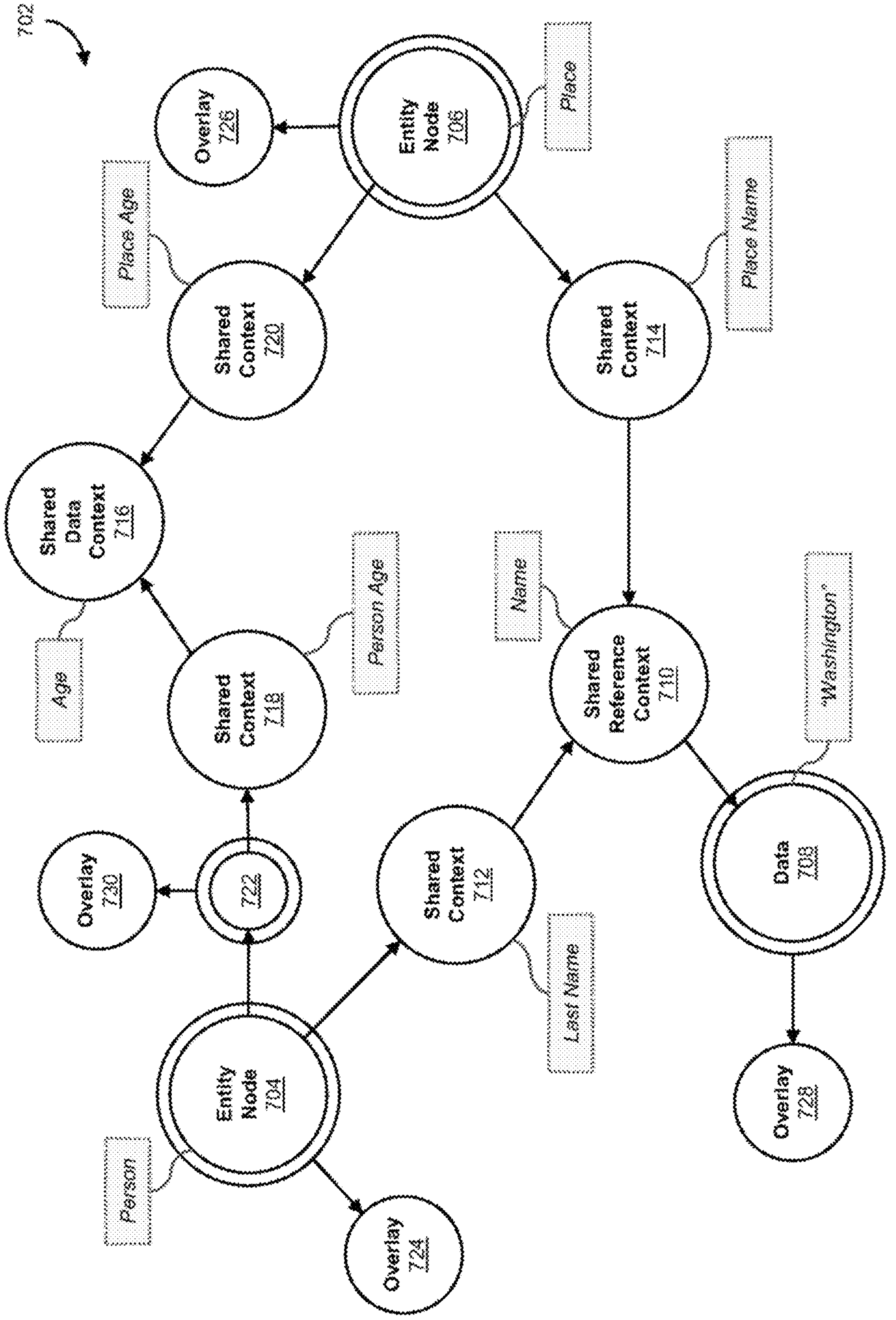
FIG. 7 shows a design of an executable graph-based model according to an embodiment of the present disclosure.

FIG. 7 shows a design of an executable graph-based model 702 according to an embodiment of the present disclosure.

The executable graph-based model 702 comprises a first entity node 704, a second entity node 706, and a data node 708. The executable graph-based model 702 also comprises a hierarchical structure of nodes which includes the data node 708, a shared reference context node 710, a first shared context node 712, and a second shared context node 714. The hierarchical structure of nodes further includes a shared data context node 716, a third shared context node 718, a fourth shared context node 720, and an edge node 722. The skilled person will appreciate that references to node types when referring to context-specific nodes (e.g., the shared reference context node 710, the first shared context node 712, etc.) has been dropped for ease of reference. The executable graph-based model 702 further includes an overlay structure comprising a first overlay node 724, a second overlay node 726, a third overlay node 728, and a fourth overlay node 730.

The first entity node 704 and the second entity node 706 correspond to nodes within the executable graph-based model 702 which are used to model or represent entities within a dataset. The first entity node 704 is used to represent a person who has a last name and an age, whilst the second entity node 706 is used to represent a place which has a place name and a place age. That is, whilst the executable graph-based model 702 shows only a single person entity node and a single place entity node, a run-time executable graph-based model representation of this model derived from a dataset may contain multiple entity nodes for different people and places represented within the dataset. The executable graph-based model 702 shown in FIG. 7 therefore represents the design of the structure which is utilized at run-time to generate specific executable nodes and the like from a dataset.

The data node 708 comprises a data value that is shared by both the first entity node 704 and the second entity node 706. For example, at run-time the data node 708 may hold the value "Washington", as indicated by the grey box in FIG. 7 connected to the data node 708. (For the avoidance of doubt, the grey boxes shown in FIG. 7 do not form a part of the executable graph-based model 702 but instead are labels displayed on top of the executable graph-based model 702 for the purpose of illustration and for ease of understanding.) Whilst the data value of the data node 708 is shared by both the first entity node 704 and the second entity node 706, the context (meaning) of the data value is different for each entity node. That is, the hierarchical structure of nodes defines contextual relationships between the data node 708 and each of the entity nodes. These contextual relationships contextually define the data value of the data node 708 in relation to each entity node.

The data value of the data node 708 is contextually defined in relation to the first entity node 704 by the shared reference context node 710 and the first shared context node 712. The shared reference context node 710 applies the context "Name" to the data value of the data node 708 whilst the first shared context node 712 further defines the context of the data value as relating to a "Last Name". Conversely, the data value of the data node 708 is contextually defined in relation to the second entity node 706 by the shared reference context node 710 and the second shared context node 714 which applies the context "Place Name" to the data value in relation to the second entity node 706. As such, the shared reference context node 710 contextually defines the data value of the data node 708 at a first level of detail whilst the first shared context node 712 and the second shared context node 714 contextually define the data value of the data node 708 at a second, greater, level of detail (i.e., the contexts of the shared reference context node 712 and the shared reference context node 714 are more refined than the context of the shared reference context node 710). For example, at run-time the context-specific nodes of the hierarchical structure contextually define the data value "Washington" as being a Name→Last Name for the person entity node and the data value "Washington" as being a Name→Place Name for the place entity node.

The hierarchy of context illustrated by the hierarchy of nodes in FIG. 7 facilitates efficient information-based searching and retrieval. For example, at run-time a query for the term "Washington" may be received and applied to a lookup table or index structure of all data nodes to return a data node corresponding to the data node 708 shown in FIG. 7. A traversal from the data node to all connected entity nodes provides a contextual response to the query (e.g., people with the last name "Washington" and places with the place name "Washington"). If the query further defines the context (e.g., the query comprises "Washington" and the context stating that the query is in relation to place names), then the received context can be used to determine that the traversal path, and thus the response, is limited to entities which have the place name "Washington". That is, a first refinement of the search "Washington" in the context of "Name" would return both the first entity node 704 and the second entity node 706 whilst a further refinement of "Name" within the context of "Places" would return the second entity node 706.

In addition, the overlay structure of the executable graph-based model 702 allows the execution of processing logic to be incorporated as part of responding to a received query. As described in detail above in relation to FIG. 4B, a base node may be "joined" with an overlay node to form an executable node which comprises a composition of the base node and the overlay node. The overlay node comprises processing logic that can interact with (e.g., query, manipulate, or otherwise modify) the base node. For example, the data node 708 is transformed to an executable node at run-time because it is associated with the third overlay node 728. That is, at run-time, the data node 708 would be the base node of an executable node comprising the composition of the data node 708 and the third overlay node 728. As such, when a query is received in relation to the data node 708 at run-time, the processing logic of the third overlay node 728 may be executed depending on the configuration of the data node 708. For example, the processing logic may be executed whenever the data node 708 is accessed/referenced in any way, or it may be executed as part of initially identifying the data node 708, as part of the traversal to determine linked entity nodes, or as part of providing the response to the query. Similarly, the processing logic of the first overlay node 724 and/or the second overlay node 726 may be executed in response to a query at run-time as part of the retrieval of the first entity node 704 and/or the second entity node 706 respectively. Advantageously, this allows processing logic to be incorporated efficiently into the generation of a response to a query thereby forming an executable query.

In the previously described example, the relationship between an entity node and a context (e.g., the relationship between the first entity node 704 and the first shared context node 712) is directly coupled. However, it may be advantageous to decouple the relationship between an entity node and a context node (e.g., to allow processing logic to be incorporated into the relationship). This is illustrated in FIG. 7 by the edge node 722 which forms a link between the first entity node 704 and the third shared context node 718. Specifically, the edge node 722 defines: (i) a first connective relationship between the first entity node 704 and the edge node 722; and (ii) a second connective relationship between the edge node 722 and the third shared context node 718.

The edge node 722 is associated with the fourth overlay node 730 which defines processing logic which can be executed at run-time in relation to the edge node 722 (e.g., whenever the edge node is accessed). The processing logic is thus defined in relation to the contextual relationship between the first entity node 704 and the third shared context node 718.

Figure 8:
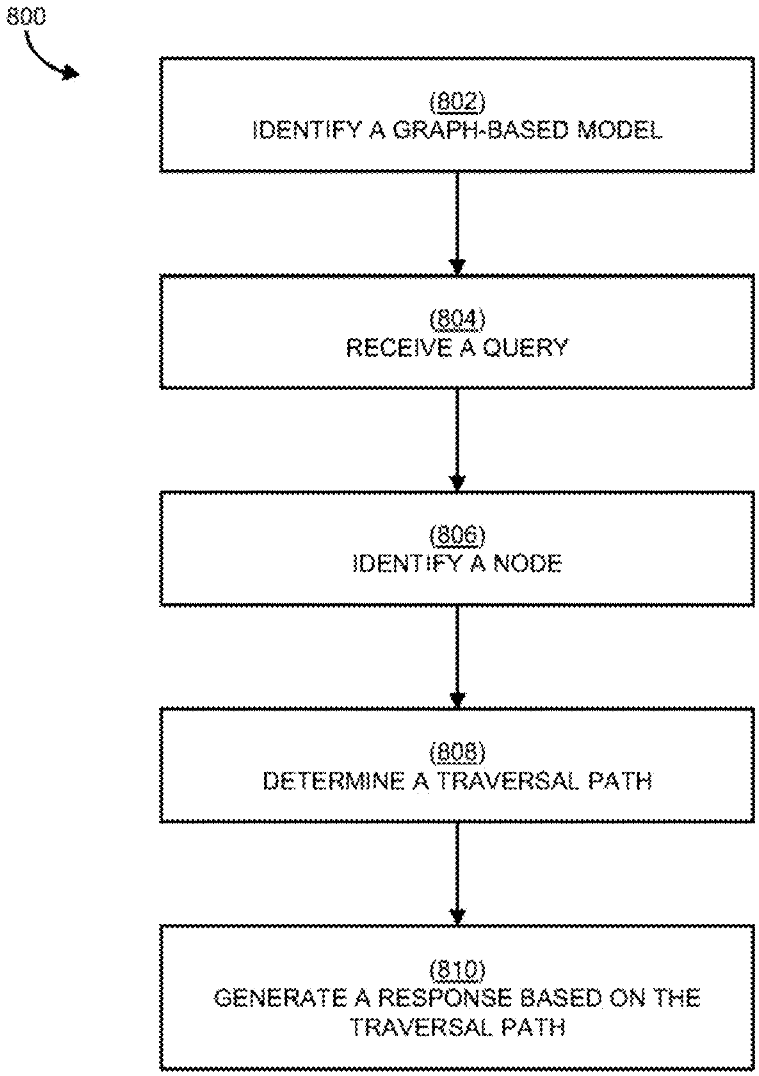
FIG. 8 shows a method for querying a dataset according to an embodiment of the present disclosure.

FIG. 8 shows a method 800 according to an embodiment of the present disclosure.

The method 800 comprises the steps of identifying 802 a graph-based model, receiving 804 a query, identifying 806 a node within the graph-based model, determining 808 a traversal based within the graph-based model, and generating 810 a response based on the traversal path. In one embodiment, the method 800 is performed by a system such as the system 300 shown in FIG. 3. In an alternative embodiment, the method 800 is performed by a computing device such as the computing system 900 shown in FIG. 9.

At the step of identifying 802, a graph-based model derived from a dataset is identified. The graph-based model can be an executable graph-based model held within memory at run-time.

The graph-based model comprises a plurality of entity nodes indicative of a plurality of entities within the dataset and a hierarchical structure of nodes including a plurality of data nodes indicative of a plurality of data values associated with the plurality of entities. The hierarchical structure further comprises a plurality of context nodes coupled between the plurality of entity nodes and the plurality of data nodes. The plurality of context nodes define contextual relationships between the plurality of entity nodes and the plurality of data nodes.

In the example shown in FIG. 7, the first shared context node 712 and the shared reference context node 710 define a contextual relationship between the first entity node 704 and the data node 708. The contextual relationship defines that the data value of the data node 708—e.g., "Washington"—relates to a Name→Last Name when used in relation to the first entity node 704. In contrast, the contextual relationship between the second entity node 706 and the data node 708 (as defined by the second shared context node 714 and the shared reference context node 710) defines that the data value of the data node 708—e.g., "Washington"—relates to a Name→Place Name when used in relation to the second entity node 706.

The graph-based model can be an executable graph-based model comprising processing logic operable to interact with one or more nodes of the executable graph-based model. That is, the executable graph-based model comprises an overlay structure that includes processing logic operable to interact with nodes of the executable graph-based model. In the example shown in FIG. 7, the first overlay node 724, the second overlay node 726, the third overlay node 728, and the fourth overlay node 730 form an overlay structure which contains processing logic operable to query, manipulate, or otherwise interact with the nodes in the executable graph based model (e.g., the first overlay node 724 is operable to interact with the first entity node 704).

At the step of receiving 804, a query comprising a query value is received.

The query can be received from a user of the executable graph-based model. Alternatively, the query can be received from a module of a system executing the executable graph-based model (e.g., as shown in FIG. 3). For example, the query can be received as a result of execution of processing logic within the executable graph-based model.

The query value relates to a data value to be found within the executable graph-based model. That is, the query value relates to a data value stored within a data node, a shared data context node, or a data context node. As such, the query value can be of type String, Integer, Float, Boolean, or any other suitable type.

The query can further comprise a context associated with the query value. The context provides a contextual definition of the query value at a certain level of detail. For example, the context may define that the query value relates to a file (i.e., a first level of contextual detail) or the context may define that the query value relates to a file which is executable (i.e., a second level of contextual detail). As such, the query value and the context together form information for an information-based search of, or retrieval from, the executable graph-based model.

At the step of identifying 806, a node within the hierarchical structure of nodes is identified based on the query value.

The node is identified by performing a search of the hierarchical structure of nodes. In one embodiment, the data nodes are organized within an index structure or look up table such that the relevant data node can be retrieved by performing a lookup of the index structure using the query value as a key. The index structure or look up table can be held in memory at run-time. Additionally, or alternatively, the hierarchical structure of nodes are searched using a suitable algorithm to identify the node associated with the query value.

The node is identified as matching the query value if the node has a data value (attribute) which is the same as the query value. Alternatively, the data value is similar to the query value according to a similarity function and a predetermined threshold level of similarity or dissimilarity. For example, a fuzzy string matching similarity function can be used and a node is identified as matching if the similarity function returns a value above the predetermined threshold (e.g., above 0.9, 0.95, 0.99, or the like). Any other suitable similarity function can be used such as Euclidean distance, L1 norm, etc. for numerical similarity or the Levenshtein distance for String similarity.

In one embodiment, the step of identifying 806 returns two or more nodes which have data values that are the same or similar to the query value. In such an embodiment, the steps of determining 808 and generating 810 (described below) are repeated for each node such that two or more responses are generated (one for each node).

At the step of determining 808, a traversal path is determined from the node to a first entity node related to the node.

The node is connected to an entity node by one or more contextual nodes within the hierarchical structure of nodes. Any entity node which is connected to the node utilizes the data value of the node in a contextual relationship defined by the one or more contextual nodes. The one or more contextual nodes between the node and an entity node is referred to as a traversal path.

Traversal paths can be determined by iteratively traversing the hierarchy of nodes within the executable graph-based model (starting at the node) until an entity node is reached. In the example shown in FIG. 7, two traversal paths exist when starting at the data node 708: (1) the shared reference context node 710→the first shared context node 712→the first entity node 704; and (2) the shared reference context node 710→the second shared context node 714→the second entity node 706.

When the query further comprises a context, the traversal path can be determined based on the context. That is, if multiple traversal paths exist from the node to entity nodes, then the traversal path (or traversal paths) which have context nodes corresponding to the context associated with the query value are determined to be the traversal path(s) to use to generate a response to the query. Continuing the above example from FIG. 7, if the context indicates that the query is in relation to the last name of a person, then traversal path (1) is determined to be the traversal path use to generate a response.

At the step of generating 810, a response to the query is generated based on the traversal path.

The response to the query is the entity node identified at the termination of the traversal path. Alternatively, the response to query is the two or more entity nodes identified in the traversal paths determined at the step of determining 808.

The response can further include the contextual relationship between the data node and the entity node. That is, the response can also include the one or more contextual nodes of the traversal path (or traversal paths). As such, the response can be a contextual response to the query.

In one embodiment, processing logic is executed as part of identifying 806 a node, determining 808 a traversal path, and/or generating 810 a response. The processing logic forms a part of the overlay structure of the executable graph-based model. For example, the processing logic may be executed when the node is initially identified (e.g., the third overlay node 728 shown in FIG. 7 is executed when the data node 708 is identified), as part of the traversal to determine linked entity nodes (e.g., the third overlay node 728, the first overlay node 724, and/or the second overlay node 726 shown in FIG. 7 are executed when determining traversal paths from the data node 708 to the first entity node 704 and/or the second entity node 706), or as part of providing the response to the query (e.g., the first overlay node 724 is executed when the first entity node 704 is provided in response to the query).

In one embodiment, a query is a compound query where two or more disparate node sets are identified and then combined to find a commonality. For example, an "AND" search between two query statements would require an intersection graph defined between the two sets of nodes whilst an "OR" search between two query statements would require a union graph defined between the two sets of nodes.

Figure 9:
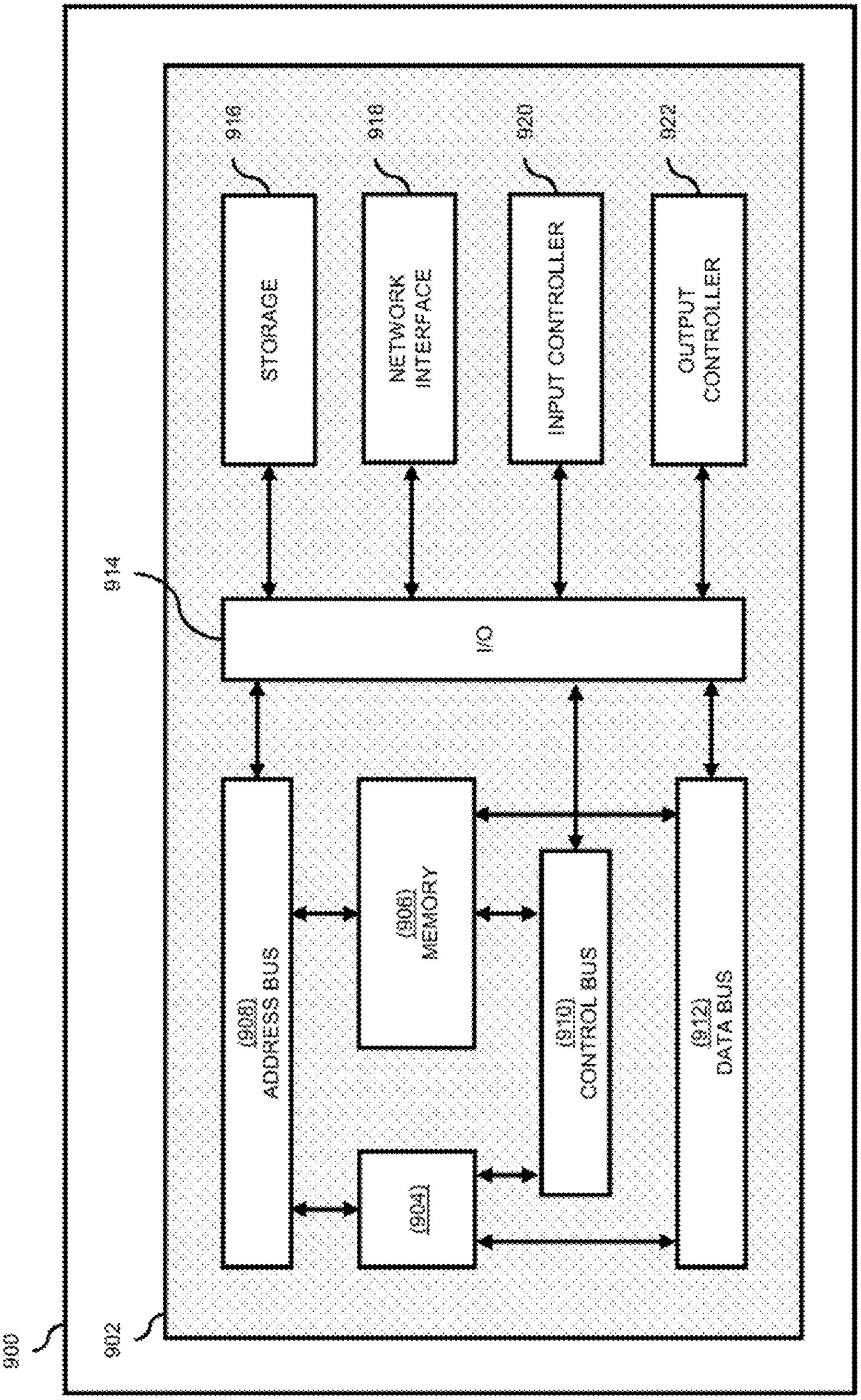
FIG. 9 shows an example computing system for carrying out the methods of the present disclosure.

FIG. 9 shows an example computing system for carrying out the methods of the present disclosure. Specifically, FIG. 9 shows a block diagram of an embodiment of a computing system according to example embodiments of the present disclosure.

Computing system 900 can be configured to perform any of the operations disclosed herein such as, for example, any of the operations discussed with reference to the functional modules described in relation to FIG. 3. The computing system 900 can be implemented as a conventional computer system, an embedded controller, a laptop, a server, a mobile device, a smartphone, a set-top box, a kiosk, a vehicular information system, one or more processors associated with a television, a customized machine, any other hardware platform, or any combination or multiplicity thereof. In one embodiment, the computing system 900 is a distributed system configured to function using multiple computing machines interconnected via a data network or bus system.

The computing system 900 includes one or more computing device(s) 902. The one or more computing device(s) 902 of computing system 900 comprise one or more processors 904 and memory 906. One or more processors 904 can be any general purpose processor(s) configured to execute a set of instructions. For example, one or more processors 904 can be a processor core, a multiprocessor, a reconfigurable processor, a microcontroller, a digital signal processor ("DSP"), an application-specific integrated circuit ("ASIC"), a graphics processing unit ("GPU"), a neural processing unit ("NPU"), an accelerated processing unit ("APU"), a brain processing unit ("BPU"), a data processing unit ("DPU"), a holographic processing unit ("HPU"), an intelligent processing unit ("IPU"), a microprocessor/microcontroller unit ("MPU/MCU"), a radio processing unit ("RPU"), a tensor processing unit ("TPU"), a vector processing unit ("VPU"), a wearable processing unit ("WPU"), a field programmable gate array ("FPGA"), a programmable logic device ("PLD"), a controller, a state machine, gated logic, discrete hardware component, any other processing unit, or any combination or multiplicity thereof. In one embodiment, one or more processors 904 include one processor. Alternatively, one or more processors 904 include a plurality of processors that are operatively connected. For example, the one or more processors 904 can be multiple processing units, a single processing core, multiple processing cores, special purpose processing cores, co-processors, or any combination thereof. One or more processors 904 are communicatively coupled to memory 906 via address bus 908, control bus 910, and data bus 912.

Memory 906 can include non-volatile memories such as read-only memory ("ROM"), programable read-only memory ("PROM"), erasable programmable read-only memory ("EPROM"), flash memory, or any other device capable of storing program instructions or data with or without applied power. The memory 906 can also include volatile memories, such as random-access memory ("RAM"), static random-access memory ("SRAM"), dynamic random-access memory ("DRAM"), and synchronous dynamic random-access memory ("SDRAM"). The memory 906 can comprise single or multiple memory modules. While the memory 906 is depicted as part of the one or more computing device(s) 902, the skill person will recognize that the memory 906 can be separate from the one or more computing device(s) 902.

Memory 906 can store information that can be accessed by one or more processors 904. For instance, memory 906 (e.g., one or more non-transitory computer-readable storage mediums, memory devices) can include computer-readable instructions (not shown) that can be executed by one or more processors 904. The computer-readable instructions can be software written in any suitable programming language or can be implemented in hardware. Additionally, or alternatively, the computer-readable instructions can be executed in logically and/or virtually separate threads on one or more processors 904. For example, memory 906 can store instructions (not shown) that when executed by one or more processors 904 cause one or more processors 904 to perform operations such as any of the operations and functions for which computing system 900 is configured, as described herein. In addition, or alternatively, memory 906 can store data (not shown) that can be obtained, received, accessed, written, manipulated, created, and/or stored. The data can include, for instance, the data and/or information described herein in relation to FIGS. 1 to 8. In some implementations, the one or more computing device(s) 902 can obtain from and/or store data in one or more memory device(s) that are remote from the computing system 900.

The one or more computing device(s) 902 further comprise I/O interface 914 communicatively coupled to address bus 908, control bus 910, and data bus 912. The I/O interface 914 is configured to couple to one or more external devices (e.g., to receive and send data from/to one or more external devices). Such external devices, along with the various internal devices, may also be known as peripheral devices. The I/O interface 914 may include both electrical and physical connections for operably coupling the various peripheral devices to the one or more computing device(s) 902. The I/O interface 914 may be configured to communicate data, addresses, and control signals between the peripheral devices and the one or more computing device(s) 902. The I/O interface 914 may be configured to implement any standard interface, such as a small computer system interface ("SCSI"), serial-attached SCSI ("SAS"), fiber channel, peripheral component interconnect ("PCI"), PCI express ("PCIe"), serial bus, parallel bus, advanced technology attachment ("ATA"), serialATA ("SATA"), universal serial bus ("USB"), Thunderbolt, FireWire, various video buses, and the like. The I/O interface 914 is configured to implement only one interface or bus technology. Alternatively, the I/O interface 914 is configured to implement multiple interfaces or bus technologies. The I/O interface 914 may include one or more buffers for buffering transmissions between one or more external devices, internal devices, the one or more computing device(s), or the one or more processors 904. The I/O interface 914 may couple the one or more computing device(s) 902 to various input devices, including mice, touch screens, scanners, biometric readers, electronic digitizers, sensors, receivers, touchpads, trackballs, cameras, microphones, keyboards, any other pointing devices, or any combinations thereof. The I/O interface 914 may couple the one or more computing device(s) 902 to various output devices, including video displays, speakers, printers, projectors, tactile feedback devices, automation control, robotic components, actuators, motors, fans, solenoids, valves, pumps, transmitters, signal emitters, lights, and so forth.

Computing system 900 further comprises storage unit 916, network interface 918, input controller 920, and output controller 922. Storage unit 916, network interface 918, input controller 920, and output controller 922 are communicatively coupled to the central control unit (i.e., the memory 906, the address bus 908, the control bus 910, and the data bus 912) via I/O interface 914. The network interface 918 communicatively couples the computing system 900 to one or more networks such as wide area networks ("WAN"), local area networks ("LAN"), intranets, the Internet, wireless access networks, wired networks, mobile networks, telephone networks, optical networks, or combinations thereof. The network interface 918 may facilitate communication with packet switched networks or circuit switched networks which use any topology and may use any communication protocol. Communication links within the network may involve various digital or analog communication media such as fiber optic cables, free-space optics, waveguides, electrical conductors, wireless links, antennas, radio-frequency communications, and so forth.

Storage unit 916 is a computer readable medium, preferably a non-transitory computer readable medium, comprising one or more programs, the one or more programs comprising instructions which when executed by the one or more processors 904 cause computing system 900 to perform the method steps of the present disclosure. Alternatively, storage unit 916 is a transitory computer readable medium. Storage unit 916 can include a hard disk, a floppy disk, a compact disc read-only memory ("CD-ROM"), a digital versatile disc ("DVD"), a Blu-ray disc, a magnetic tape, a flash memory, another non-volatile memory device, a solid-state drive ("SSD"), any magnetic storage device, any optical storage device, any electrical storage device, any semiconductor storage device, any physical-based storage device, any other data storage device, or any combination or multiplicity thereof. In one embodiment, the storage unit 916 stores one or more operating systems, application programs, program modules, data, or any other information. The storage unit 916 is part of the one or more computing device(s) 902. Alternatively, the storage unit 916 is part of one or more other computing machines that are in communication with the one or more computing device(s) 902, such as servers, database servers, cloud storage, network attached storage, and so forth.

What is claimed is:

1. A system for querying a dataset, the system comprising:

a memory storing a graph-based model derived from the dataset, the graph-based model comprising:

a plurality of entity nodes indicative of a plurality of entities within the dataset;
a hierarchical structure of nodes including:
a plurality of data nodes indicative of a plurality of data values associated with the plurality of entities; and
a plurality of context nodes coupled between the plurality of entity nodes and the plurality of data nodes, wherein:
the plurality of context nodes define contextual relationships between the plurality of entity nodes and the plurality of data nodes,
a structure of each of the plurality of context nodes is indicative of a context node type of a plurality of context node types,
the context node type of each of the plurality of context nodes is indicative of the contextual relationship defined by the corresponding context node,
the plurality of context node types comprise: a data context node type, a reference context node type, a shared context node type, a shared data context node type, and a shared reference context node type, and
the plurality of context node types are functionally extendable with first processing logic via an overlay that provides, at run-time, the ability to process data associated with the plurality of data nodes; and
processing circuitry coupled to the memory and configured to:
receive a query comprising a query value;
identify a node within the hierarchical structure of nodes based on the query value;
determine one or more traversal paths by iterative traversal of the hierarchical structure of nodes within the graph-based model until a first entity node is reached, wherein the one or more traversal paths are determined based on the plurality of context nodes corresponding to the context associated with the query; and
generate a response to the query based on the one or more traversal paths.

2. The system of claim 1, wherein the query further comprises a context associated with the query value.

3. The system of claim 2, wherein the processing circuitry is further configured to determine the one or more traversal paths based on the context associated with the query value.

4. The system of claim 1, wherein the graph-based model is an executable graph-based model comprising one or more nodes that are dynamically generated at run-time by one or more modules of the system.

5. The system of claim 1, wherein the overlay is usable to process a stimulus received from a source external to the system.

6. The system of claim 1, wherein the graph-based model further comprises an edge node coupled to the first entity node of the plurality of entity nodes and defines a first connective relationship between the edge node and the first entity node.

7. The system of claim 6, wherein the edge node is coupled to the first entity node via a first role node which defines at least one of a set of attributes or second processing logic associated with the first connective relationship.

8. The system of claim 6, wherein the edge node is further coupled to a first context node of the plurality of context nodes and defines a second connective relationship between the edge node and the first context node of the plurality of context nodes.

9. The system of claim 8, wherein the edge node is coupled to the first context node via a second role node which defines at least one of attributes or second processing logic associated with the second connective relationship.

10. The system of claim 1, wherein the processing circuitry is further configured to identify the node within the hierarchical structure of nodes, based on an index structure associated with the hierarchical structure of nodes.

11. The system of claim 10, wherein the memory further stores the index structure.

12. The system of claim 1, wherein the plurality of data nodes include a first data node having a data value and the plurality of context nodes include a first context node associated with the first data node, and wherein the first context node contextually defines the data value of the first data node at a first level of detail.

13. The system of claim 12, wherein the first context node is coupled to a single entity node of the plurality of entity nodes.

14. The system of claim 12, wherein the first context node is coupled to two or more entity nodes of the plurality of entity nodes and shares the data value of the first data node across the two or more entity nodes.

15. The system of claim 14, wherein the first context node is coupled to the first entity node of the two or more entity nodes via a first intermediate context node.

16. The system of claim 15, wherein the first context node is coupled to a second entity node of the two or more entity nodes via a second intermediate context node.

17. The system of claim 16, wherein the first intermediate context node and the second intermediate context node contextually define the data value of the first data node at a second level of detail greater than the first level of detail.

18. The system of claim 16, wherein the first intermediate context node and the second intermediate context node define different contexts of the data value of the first data node.

19. A method for querying a dataset, the method comprising:
identifying, by processing circuitry, a graph-based model derived from the dataset, the graph-based model comprising a plurality of entity nodes indicative of a plurality of entities within the dataset, and a hierarchical structure of nodes including a plurality of data nodes indicative of a plurality of data values associated with the plurality of entities, and a plurality of context nodes coupled between the plurality of entity nodes and the plurality of data nodes, wherein:
the plurality of context nodes define contextual relationships between the plurality of entity nodes and the plurality of data nodes,
a structure of each of the plurality of context nodes is indicative of a context node type of a plurality of context node types,
the context node type of each of the plurality of context nodes is indicative of the contextual relationship defined by the corresponding context node,
the plurality of context node types comprise: a data context node type, a reference context node type, a shared context node type, a shared data context node type, and a shared reference context node type, and
the plurality of context node types are functionally extendable with first processing logic via an overlay that provides, at run-time, the ability to process data associated with the plurality of data nodes;
receiving, by the processing circuitry, a query comprising a query value;

identifying, by the processing circuitry, a node within the hierarchical structure of nodes based on the query value;

determining, by the processing circuitry, one or more traversal paths by iterative traversal of the hierarchical structure of nodes within the graph-based model until a first entity node is reached, wherein the one or more traversal paths are determined based on the plurality of context nodes corresponding to the context associated with the query; and generating, by the processing circuitry, a response to the query based on the one or more traversal paths.

20. A non-transitory computer-readable medium comprising instructions which, when executed by a processor cause the processor to:

identify a graph-based model derived from a dataset, the graph-based model comprising a plurality of entity nodes indicative of a plurality of entities within the dataset, and a hierarchical structure of nodes including a plurality of data nodes indicative of a plurality of data values associated with the plurality of entities, and a plurality of context nodes coupled between the plurality of entity nodes and the plurality of data nodes, wherein:

the plurality of context nodes define contextual relationships between the plurality of entity nodes and the plurality of data nodes, a structure of each of the plurality of context nodes is indicative of a context node type of a plurality of context node types, the context node type of each of the plurality of context nodes is indicative of the contextual relationship defined by the corresponding context node, and the plurality of context node types comprise: a data context node type, a reference context node type, a shared context node type, a shared data context node type, and a shared reference context node type, and the plurality of context node types are functionally extendable with first processing logic via an overlay that provides, at run-time, the ability to process data associated with the plurality of data nodes;

receive a query comprising a query value;

identify a node within the hierarchical structure of nodes based on the query value;

determine one or more traversal paths by iterative traversal of the hierarchical structure of nodes within the graph-based model until a first entity node is reached, wherein the one or more traversal paths are determined based on the plurality of context nodes corresponding to the context associated with the query; and generate a response to the query based on the one or more traversal paths.

* * * * *